(12) United States Patent
Fujimori

(10) Patent No.: US 7,222,928 B2
(45) Date of Patent: May 29, 2007

(54) PRINTER CONTROL UNIT, PRINTER CONTROL METHOD, PRINTER CONTROL PROGRAM, MEDIUM STORING PRINTER CONTROL PROGRAM, PRINTER, AND PRINTING METHOD

(75) Inventor: Yukimitus Fujimori, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 876 days.

(21) Appl. No.: 10/273,492

(22) Filed: Oct. 18, 2002

(65) Prior Publication Data

US 2003/0090686 A1 May 15, 2003

(30) Foreign Application Priority Data

Oct. 24, 2001 (JP) ............................. 2001-326189

(51) Int. Cl.
*B41J 2/205* (2006.01)
(52) U.S. Cl. ...................... 347/15; 358/1.2; 358/1.9
(58) Field of Classification Search .............. 347/15; 358/1.2, 1.9
See application file for complete search history.

(56) References Cited

U.S. PATENT DOCUMENTS

| 5,594,555 | A | * | 1/1997 | Ishida ..................... 358/448 |
| 6,375,294 | B1 | * | 4/2002 | Kneezel ...................... 347/9 |
| 2001/0015818 | A1 | * | 8/2001 | Kawanabe et al. ........ 358/1.15 |

FOREIGN PATENT DOCUMENTS

| JP | 57-095469 | 6/1982 |
| JP | 04-211569 | 8/1992 |
| JP | 07-178930 | 7/1995 |
| JP | 10-013676 | 1/1998 |
| JP | 10-286957 | 10/1998 |
| JP | 11-208029 | 8/1999 |

OTHER PUBLICATIONS

Abstract of Japanese Patent Publication No. 57-095469, Pub. Date: Jun. 14, 1982, Patent Abstracts of Japan.
Abstract of Japanese Patent Publication No. 04-211569, Pub. Date: Aug. 3, 1992, Patent Abstracts of Japan.

(Continued)

*Primary Examiner*—Stephen Meier
*Assistant Examiner*—Jason Uhlenhake
(74) *Attorney, Agent, or Firm*—Martine Penilla & Gencarella, LLP

(57) ABSTRACT

There has been an inefficient respect for printing control in a color printer in which only nozzle columns for black ink are high resolution. For a color printer 17b equipped with a plurality of nozzles arranged zigzag so that dark color ink droplets and light color ink droplets can be squirted onto one pixel at high resolution, resolution reduction to combine adjoining two lines into one line is performed (in step S400) and dark-light color separation is performed (in step S500), and subsequently nozzles for dark color ink and nozzles for light color ink squirt ink droplets for one pixel of pixels of two lines, thereby handling pixels for two lines as one pixel, and hence it is possible to realize high-speed printing mode with reduced scanning number to squirt ink droplets for all pixels of high resolution.

8 Claims, 36 Drawing Sheets

OTHER PUBLICATIONS

Abstract of Japanese Patent Publication No. 07-178930, Pub. Date: Jul. 18, 1995 Patent Abstracts of Japan.
Abstract of Japanese Patent Publication No. 10-013676, Pub. Date: Jan. 16, 1998, Patent Abstracts of Japan.
Abstract of Japanese Patent Publication No. 10-286957, Pub. Date: Oct. 27, 1998, Patent Abstracts of Japan.
Abstract of Japanese Patent Publication No. 11-208029, Pub. Date: Aug. 3, 1999, Patent Abstracts of Japan.

* cited by examiner

Fig. 7

| | | | | | | |
|---|---|---|---|---|---|---|
| ... | 140 | ... | 255 | ... | 128 | ... |
| ... | 100 | ... | 155 | ... | 0 | ... |

Odd / Even
360dpi

| | | | | | | |
|---|---|---|---|---|---|---|
| ... | 120 | ... | 205 | ... | 64 | ... |

180dpi Average value

| | | | | | | |
|---|---|---|---|---|---|---|
| ... | 140 | ... | 255 | ... | 128 | ... |

180dpi Maximum value

Fig. 12

| One-color data | Two-color data ||
|---|---|---|
| | L | D |
| 0 | 0 | 0 |
| ⋮ | ⋮ | ⋮ |
| 255 | 255 | 255 |

Fig. 18

| 360dpi | | 180dpi |
|---|---|---|
| Odd | Even | Minimum value |
| ⋮ | ⋮ | ⋮ |
| 140 | 100 | 100 |
| ⋮ | ⋮ | ⋮ |
| 255 | 155 | 155 |
| ⋮ | ⋮ | ⋮ |
| 128 | 0 | 0 |
| ⋮ | ⋮ | ⋮ |

Fig. 22

|  | (2n-1)<br>Odd | 2n<br>Even |  |
|---|---|---|---|
| ... | 140 | 100 | ... |
| ... | 255 | 155 | ... |
| ... | 128 | 0 | ... |
|  |  |  |  |

Fig. 23

| | n | |
|---|---|---|
| ... | 120 | ... |
| ... | 205 | ... |
| ... | 64 | ... |
| | | |

Fig. 30

| Col1 | Col2 |
|---|---|
| Large | Small |
| Large | Medium |
| Large | Large |
|  | Large |
| Large |  |
| Medium Medium | Large |
| Medium Medium | Small |
|  | Medium Medium |
|  | Medium |
| Medium |  |
| Small Small | Large |
| Small Small | Medium |
| Small | Small |
|  | Small |
| Small |  |
|  |  |

Fig. 31

Maximum dot | Small | Small | Small | Medium | Large | Medium | Medium | Medium | Large | Large | Large | Large | Large |

Fig. 33

Upper dots

|  | None | Small | Medium | Large |
|---|---|---|---|---|
| None | None | Small | Small | Medium |
| Small | Small | Small | Medium | Large |
| Medium | Small | Medium | Large | Large |
| Large | Medium | Large | Large | Large |

Lower dots

Fig. 34

| Table referencing | Small | Small | Small | Medium | Large | Small | Small | Large | Medium | Large | Medium | Medium | Large | Large |
|---|---|---|---|---|---|---|---|---|---|---|---|---|---|---|
| | | | | | 6 | | | 9 | | | | | | 16 |

PRINTER CONTROL UNIT, PRINTER CONTROL METHOD, PRINTER CONTROL PROGRAM, MEDIUM STORING PRINTER CONTROL PROGRAM, PRINTER, AND PRINTING METHOD

BACKGROUND OF THE INVENTION

1. Field of the Invention

The present invention relates to a printer control unit, printer control method, printer control program, medium storing printer control program, printer, and printing method.

2. Description of the Prior Art

An ink-jet printer squirts ink droplets onto pixels arranged in dot-matrix array through the nozzles of the print head, thereby performing printing. The nozzles of the print head are arranged at a constant interval in the paper feed direction, and they constitute the nozzle column. Usually, an ink-jet printer has one or more nozzle columns for each color ink.

The nozzle interval is not related directly with the printing resolution; however, the nozzle interval in the paper feed direction usually corresponds to the printing resolution. For example, it will be possible to arrange nozzles (for one color ink) in two columns, offset by half the nozzle spacing, so that each of two columns prints one line of pixels alternately. In this case, each nozzle squirts as many ink droplets as necessary to completely fill one line.

With the above-mentioned structure, the first column of nozzles and the second column of nozzles are allotted alternately to one line having pixels arranged in dot matrix array, and the nozzles squirt ink droplets of specified color to print a completely filled image as desired. Once the printing resolution based on the nozzle interval is established, it is possible to prepare image data (for printing data) according to the printing resolution.

There is another structure designed to eliminate "graininess" resulting from an ink-jet printer. With this structure, nozzles in the first column squirt a dark color ink and nozzles in the second column squirt a light color ink.

It is assumed that the distance between adjacent nozzles in each column is equivalent to 180 dpi and the distance between the first and second columns is equivalent to 360 dpi. It is further assumed that the size of a dot formed by an ink droplet is equivalent to 360 dpi. In this case, when the print head traverses the paper, each line of pixels is printed with a dark color ink and a light color ink alternately. Subsequently, printing is repeated, with the print head shifted by a distance equivalent to 360 dpi, so that the line for a dark color ink and the line for a light color ink are exchanged each other. In this way it is possible to print each line of pixels with a dark color ink and a light color ink, thereby eliminating graininess. In this case, the image data corresponds to the printing resolution of 360 dpi as a matter of course.

The conventional high-resolution printing mentioned above employs nozzles arranged zigzag in two columns to eliminate graininess. The disadvantage of this system for high resolution is a low print speed. Monochrome printing with black ink squirted from nozzles arranged zigzag in two columns permits high-speed printing with 360-dpi resolution by one print head traverse; however, this advantage is offset by slow printing with a dark color ink and a light color ink which are squirted separately twice.

SUMMARY OF THE INVENTION

The present invention was completed in view of the foregoing. It is an object of the present invention to provide a printer control unit, printer control method, printer control program, medium storing printer control program, printer, and printing method, which are designed for efficient use of a printer by a new printer control method.

The present invention is intended to control an inkjet printer which has a plurality of nozzles to squirt ink droplets onto individual pixels for high-resolution printing. The printer control unit of the present invention creates low-resolution image data from high-resolution image data when it sends printing data to the printer. In the image data with reduced resolution, each pixel is formed from its neighboring pixels in the image data with high resolution. The image data with reduced resolution is used when the above-mentioned nozzles squirt ink droplets onto individual pixels for high resolution printing.

The conventional technology causes the nozzles to squirt ink droplets onto individual pixels in response to the high-resolution image data. Since the resolution of the nozzles does not accord with the pixels of the high-resolution image data, the pint head has to cause several print head traverses to complete printing. In contrast, according to the present invention, it is possible to reduce the number of print head traverses because the low-resolution image data eliminates or reduces the difference between the resolution of the nozzles and the resolution of the image data. This is accomplished in such a way that two nozzles squirt ink droplets onto different pixels corresponding to high resolution instead of squirting ink droplets onto a single pixel.

FIG. 36 is a schematic diagram showing how nozzles arranged zigzag on a print head squirt ink droplets onto individual pixels. For easy understanding, the correspondence of one nozzle with one ink droplet is indicated by two marks ○ and ∆. These marks also serve to distinguish between two nozzle columns. Ordinarily, two nozzles squirt ink droplets onto individual pixels for high resolution. (The reason for this is that two nozzle columns are used for dark color ink and light color ink, respectively, to improve tone reproduction.) The resolution of nozzles in one column does not agree with that of pixels, and the direct consequence of this is that it is impossible to print all pixels by a single print head traverse. However, if two neighboring pixels (up and down) are combined into one pixel for reduction of resolution, then it is possible to form a vertically elongated pixel as shown in FIG. 36. Such pixels can be filled with ink from two nozzle columns without the necessity of overstriking each pixel for high resolution. The consequence is that printing is completed each time the print head traverses.

As mentioned above, the present invention is designed to reduce the resolution of the image data and then cause more than one nozzle to squirt ink droplets onto one pixel. In this way it is possible to create a new printing mode (and printer control unit) by using existing hardware resources. By combining neighboring pixels into one pixel, it is possible to easily reduce the resolution to its integral submultiple.

Another embodiment of the present invention is designed to create low-resolution image data from high-resolution image data, the former having a less number of lines than the latter. Whereas high-resolution printing represents two pixels with four ink droplets (at maximum) because two nozzles squirt ink droplets onto each of two pixels, low-resolution printing represents one pixel with two ink droplets (at maximum) because two nozzles squirt ink droplets individually onto two pixels. If nozzles are arranged zigzag, two adjacent nozzles (in different columns but in the same row) squirt ink droplets individually to form a pixel for low resolution. In the case shown in FIG. 36, the upper two nozzles constitute a pair and the lower two nozzles constitute another pair. In this way it is possible to reduce the resolution of image data by reducing the number of rows all at once. Arithmetic for this procedure is comparatively easy.

In another embodiment of the present invention, reducing the resolution to its integral submultiple is accomplished in such a way that low-resolution image data is created from high-resolution image data by reducing the number of columns in the latter. (Resolution is reduced in the row direction in the former embodiment and in the column direction in the latter embodiment.) Since more than one nozzle column exist and they are driven simultaneously, nozzles should be arranged in the column direction such that ink droplets squirted from them do not overlap with one another. According to this procedure, reduction of resolution is accomplished by combining two horizontally adjacent pixels into one, unlike the case shown in FIG. 36, in which reduction of resolution is accomplished by combining two vertically adjacent pixels into one.

In the case where reduction of resolution is accomplished by combining two columns into one, ink droplets squirted from two nozzles adjoin each other in the horizontal direction. It follows, therefore, that two nozzles adjoining in the horizontal direction squirt ink droplets to form one pixel of low resolution. In this way it is possible to reduce the resolution of image data by reducing the number of columns all at once. Arithmetic for this procedure is comparatively easy.

There are several possible ways for nozzles to squirt ink droplets individually onto pixels in response to the image data in which the resolution has been reduced. According to the embodiment of the present invention, the nozzles are divided into small groups which squirt color inks differing in darkness. Thus, pixels with low resolution are formed by nozzles belonging to each group. For example, it follows that there are two kinds of nozzle groups for two kinds of color inks differing in darkness. Two adjacent groups of nozzles squirt color ink differing in darkness to form two adjacent pixels. In the case shown in FIG. 36, the nozzles in column marked with ○ squirt a dark color ink and the nozzles in column marked with Δ squirt a light color ink. In this way it is possible to cause the nozzles to squirt color inks differing darkness, thereby carrying out high-speed printing easily with reduced resolution.

According to another embodiment of the present invention, it is also possible to cause the nozzles to squirt only a color ink with a single darkness. This is because a color ink with a single darkness inherently permits printing so long as it has the maximum darkness. In the case shown in FIG. 36, the nozzles in column marked with ○ squirt a dark color ink but the nozzles in column marked with Δ do not squirt a light color ink. Printing is also possible even in this manner; not executing processing for the light color ink accelerates printing accordingly. In this way it is possible to reduce the number of color inks differing in darkness and hence it is possible to save the amount of color inks to be consumed.

Printing with color inks differing in darkness is demonstrated in another embodiment of the present invention. According to this embodiment, more than one gradation is formed by a combination of color inks differing in darkness. For example, with two color inks, dark and light, it is possible to form gradation in three grades, such as light<dark<(light+dark). It is also possible to form gradation in four grades if the absence of color ink is taken into account. In the case shown in FIG. 36, this gradation is represented by (no ink)<(Δ alone)<(○ alone)<(Δ+○), where ○ stands for a dark dot and Δ stands for a light dot.

The combination of color inks differing in darkness as mentioned above permits more subtle color separation.

According to another simplified embodiment of the present invention, color separation is accomplished according to the number of sections of darkness. In this case, color separation is carried out as many times as the number of sections. For example, two kinds of color inks differing in darkness give two tones (or three tones if the absence of color ink is taken into account). In the case shown in FIG. 36, these tones are represented by (no ink)<(Δalone)<(○ alone), where ○ stands for a dark dot and Δ stands for a light dot. In this way it is possible to carry out color separation easily according to the number of sections of darkness.

The reduction of resolution may be accomplished in various stages of image data processing. Among these stages is the one in which the image data represents the dot of printing pixel. This example is demonstrated in another embodiment of the present invention. If the image data is binary data to represent the presence or absence of a dot, the low-resolution image data is created by performing OR operation on the original high-resolution image data. An example follows. Assuming that two adjacent pixel lines are "01010101 . . . " and "00110010 . . . ", OR operation is performed sequentially (starting from the first bit) to give "01110111 . . . ". In this way, two lines of pixels are reduced into one line of pixels and the low-resolution image data is obtained as desired. The reduction of resolution is accomplished easily in this way for the image data in which pixels are represented by binary data.

Incidentally, although the OR operation may be performed on each color, it may be performed on only specific colors. The choice depends on the printing speed and quality required. This is exemplified in another embodiment of the present invention. According to this embodiment, the above-mentioned OR operation is performed on only yellow color when the low-resolution image data is created. In this way it is possible to achieve the desired printing speed and quality.

The representation of dots by binary data may be applied to printing dots differing in size (e.g., small dot, medium dot, and large dot). In this case binary data is used for each size. This is exemplified in another embodiment of the present invention. According to this embodiment, the low-resolution image data is created by performing OR operation on the original high-resolution image data representing different sizes. In other words, OR operation is performed on the image data representing small dots, medium dots, and large dots in the same way as mentioned above. In this way it is possible to easily reduce resolution even in the case where dots with different sizes are produced.

There is an instance where image data to represent dot size by binary data is utilized in printing dots differing in size. For example, two bits represent two digits of binary number such that "00" corresponds to no ink squirt, "01" corresponds to a small dot, "10" corresponds to a medium dot, and "11" corresponds to a large dot. According to an embodiment of the present invention, such image data is utilized to create the low-resolution image data by selecting values for the larger size in the original high-resolution image data. For example, assuming that the original high-resolution image data contain the following data representing two adjacent lines for pixels:

"X S X S S S M X M M M L X L L L . . . " and

"X X S S M L X M M S L X L L M S . . . "

(where X denotes "no ink squirted", S denotes a small dot, M denotes a medium dot, and L denotes a large dot.) then selection is made to give the following data.

"X S S S M L M M M M L L L L L L . . . "

Thus the reduction of resolution is implemented by selecting values for larger pixels from adjacent two lines and creating a new line as mentioned above. In this way it is possible to easily reduce the resolution (without blurring) by simply selecting maximum values from multi-valued data.

It should be noted, however, that the above-mentioned procedure is not necessarily good if printing is possible with color inks differing in darkness by more than one step. Therefore, according to another embodiment of the present invention, the low-resolution image data is created in the following manner. For light color inks, multi-valued data for average size is selected; and for dark color inks, multi-valued data for maximum size is selected. The former procedure is necessary to ensure tone reduction, while the latter procedure is necessary to enhance color darkness. In this way it is possible to easily ensure tone reproduction in the case where light color inks are used. However, more realistic adjustment should preferably be made when dots differing in size are to be formed. According to another embodiment of the present invention, this object is achieved in the following manner. A conversion table is prepared which specifies one size for the combination of values in the original high-resolution image data. And this conversion table is referenced when the low-resolution image data is created by specifying the multi-valued data for one size.

For the combination of four pixel sizes (no ink, small dot, medium dot, and large dot), correspondence is made as follows.

Assuming no ink in one side.
no ink and no ink→no ink
no ink and small dot→small dot
no ink and medium dot→small dot
no ink and large dot→medium dot Assuming a small dot in one side.
small dot and small dot→small dot
small dot and medium dot→medium dot
small dot and large dot→large dot Assuming a medium dot in one side.
medium dot and medium dot→large dot
medium dot and large dot→large dot Assuming a large dot in one side.
large dot and large dot→large dot The referencing of the conversion table is implemented in the following way. If the multi-valued data represents (with two bits) two digits of a binary number, then the two multi-valued data are combined into four bits, and these four bits are used to address a two-bit data value. In this way it is possible to use the conversion table and make adjustment in response to the actual printing result. Thus it is possible to improve printing quality including tone reproduction.

One way to speed up printing when multi-value data in binary number representing each size is adopted is demonstrated in another embodiment of the present invention. According to this embodiment, OR operation is performed on each digit of the original high-resolution image data and the resulting multi-value data is adopted as the low-resolution image data. For example, "00" and "01" result in "01" after OR operation on the lower digits, "10" and "00" result in "10" after OR operation on the upper digits, and "11" and "00" result in "11" after OR operation on the upper and lower digits.

Assuming the adjacent two lines to have the following pixel arrangement as in the preceding example:

"X S X S S S M X M M M L X L L L . . . " and

"X X S S M L X M M S L X L L M S . . . "

which is equivalent to:

"00 01 00 01 01 01 10 00 10 10 10 11 00 11 11 11 . . . " and

"00 00 01 01 10 11 00 10 10 01 11 11 11 11 10 01 . . . "

therefore, the result of OR operation is:

"00 01 01 01 11 11 10 10 11 11 11 11 11 11 11 11 . . . "

which is equivalent to:

"X S S S L L M M M L L L L L L L . . . ".

The procedure deteriorates tone reproduction more than the preceding one but carries out operation very fast. In this way it is possible to perform operation extremely fast even in the case of pixels differing in size. The foregoing procedure leads to a printing control program which enables the reduction of resolution to be implemented at the time of blightness in light.

In general, printing with a computer is carried out in such a way that the image data represent the RGB color space and the printed color inks represent the CMY color space. In other words, conversion of the color space takes place at the time of printing. The tone value in the RGB color space is proportional to lightness and the tone value in the CMY color space is proportional to ink darkness. Hereinafter, the tone value which represents the tone of lightness is represented as blightness in light, and the tone value which represents the tone in ink darkness is represented as ink darkness.

Reduction of the resolution can be accomplished in each color space. According to one embodiment of the present invention, reduction of the resolution is accomplished when image data corresponding to blightness in light is converted into image data corresponding to ink darkness. In this case the low-resolution image data is created from more than one high-resolution image data. One effective way to reduce resolution in response to blightness in light is demonstrated in another embodiment of the present invention. According to this embodiment, the original image data having the minimum values is used as the image data with reduced resolution. In this way it is possible to facilitate ink squirt, thereby preventing blurs.

Even if the tone value at the time of blightness in light is small, it increases after conversion into the tone value in the color space for ink darkness. In other words, a darkest pixel in a plurality of pixels represents the image data. This implies a tendency toward squirting as much color ink as possible. Let us assume a case in which two lines are combined into a single line, the first line having an underline as wide as one pixel line and the second line being completely blank. In this case the colored pixels are left so as to prevent the underline from disappearing or blurring when the resolution is reduced. This concept is applicable to characters and graphs in order to prevent them from blurring.

When to carry out the resolution reduction is demonstrated in another embodiment of the present invention. According to this embodiment, when the color image data corresponding to blightness in light is converted into the color image data corresponding to ink darkness, the resolution is reduced in terms of ink darkness and then printing with dark and light color inks is carried out. In this way it is possible to provide a printing control program which permits one to reduce resolution when selecting ink darkness and to print with dark and light color inks at the same time.

According to another embodiment of the present invention, the maximum value in the image data for a plurality of pixels after conversion is regarded as the image data with reduced resolution. In this case the image data for a plurality of pixels that specify ink darkness undergo resolution reduction. Giving a priority to the maximum value means that colored pixels are left as many as possible. Therefore, it is possible to prevent an underline from disappearing or blurring when the resolution is reduced. According to this embodiment, the original image data having the maximum values is used as the image data with reduced resolution. In this way it is possible to facilitate ink squirt, thereby preventing blurs.

Incidentally, an adequate method of reducing the number of steps for conversion is demonstrated in another embodiment of the present invention. According to this embodiment, when the color image data corresponding to blightness in light is converted into the color image data corresponding to ink darkness, conversion for ink density along with dark-light separation is carried out first and then reduction of resolution is carried out. In this way it is possible to carry out color transformation and color separation at one time. For example, conversion of the color image data for blightness in light in the RGB color space into the color image data in the CMYK color space takes place such that cyan and magenta (typical of dark color ink) are separated from light cyan and light magenta (typical of light color ink), and this conversion is followed by reduction of resolution. In this way it is possible to maintain the accuracy of image comparatively easily.

According to another embodiment of the present invention, the reduction of resolution is accomplished in such a way that the maximum value in the original image data for a plurality of pixels is used for dark color ink and the average value in the original image data for a plurality of pixels is used for light color inks.

Under the condition that dark color ink is squirted preferentially when dark color ink and light color ink are used separately, it seems that a good image will be obtained if dots become conspicuous when the resolution is reduced. In contrast, under the condition that light color ink is squirted preferentially when dark color ink and light color ink are used separately, it seems that a good image will be obtained if dots become inconspicuous when the resolution is reduced. Since the image data represent the ink density, the maximum value leaves dots and the average value produces the original density without making dots conspicuous. In this way it is possible to make dots inconspicuous in light sections.

The above-mentioned method for reducing the resolution is not the only one according to the present invention. It may be modified for varied situations. As the method in other situations, in another embodiment of the present invention, any one is selected from a plurality of methods, thereby making it the state in which the reduction of resolution can be accomplished, and as the default method at that time, the average value in the image data for a plurality of pixels in the original to be converted is made the image data when resolution is reduced. In this way it is possible to provide a method of reducing resolution by default as well as by other means for reducing resolution.

The print control mentioned above will be efficiently implemented in the hardware environment in which the number of nozzles assigned for each color varies. In this case, the reduction of resolution will be carried out for the color to which a less number of nozzles are assigned. In this way it is possible to perform efficient print control by separately controlling colors for a less number of nozzles.

In the case where a plurality of nozzles squirt ink droplets onto individual pixels, printing is completed with only one print head traverse even though ink squirt is based on the original image data for high resolution. By contrast, in the case where a plurality of nozzles squirt ink droplets onto one pixel for high resolution, printing to fill all pixels for high resolution is not completed with a single print head traverse. In the latter case, however, printing is completed with a single print head traverse if the reduction of resolution is performed on the nozzles so that a plurality of nozzles squirt ink droplets onto individual pixels. Thus, only one print head traverse covers all the pixels.

The method of reducing the number of print head traverses by eliminating or decreasing the difference between the resolution of the nozzles and the resolution of the image data by creating the low-resolution image data is not necessarily limited to tangible apparatus; it is easily understood that the method functions per se.

Such a printer control apparatus may exist alone or may be incorporated into other apparatus. The concept of the present invention embraces various embodiments; it may be concerned with hardware as well as software. Modifications and changes may be made as required.

The concept of the present invention may be embodied in software for printer control apparatus. Therefore, the present invention may exist and may be used in the form of such software as a matter of course.

In addition, the present invention may exist in the form of a medium storing such software. Examples of the medium include magnetic recording medium, magneto-optical recording medium, and any recording medium which will be developed in the future. The medium also includes its copies.

Moreover, the present invention may be embodied partly in the form of software and partly in the form of hardware without any discrimination. There may be an embodiment in which the software is partly stored in a recording medium and read in as required.

In the case where the present invention is realized in the form of software, the software may be used in combination with hardware and its operating system or may be used independently from them. For example, various operations may be performed by invoking relevant functions contained in the operating system or by entering such functions from the hardware without invoking them. Even though the present invention is practically realized in the presence of an operating system, it should be understood that if the present invention is in the form of a program, it can be realized only with the program stored on a recording medium.

In the case of a printing apparatus equipped with a plurality of nozzles to squirt color inks differing in darkness, ink droplets are squirted to one pixel from a plurality of nozzles. Therefore, each pixel receives more than one color ink differing in darkness. However, the above-mentioned printer control causes individual nozzles to squirt ink droplets to individual pixels according to the image data with reduced resolution. Thus, the color ink squirted from a specific row or column has a uniform darkness. This is the way in which the printer control is implemented. The printer control mentioned above is specific to the printer control apparatus, printing apparatus, and printing method provided by the present invention.

Other and further objects, features and advantages of the invention will appear more fully from the following description.

BRIEF DESCRIPTION OF THE DRAWINGS

FIG. 7 is a diagram showing the change in data that occurs in the process of reducing resolution;

FIG. 12 is a diagram showing the reference table for the color separation process;

FIG. 18 is a diagram showing the change in data that occurs in the process of reducing resolution pertaining to the fourth modified embodiment;

FIG. 22 is a diagram showing the image data before the reduction of resolution;

FIG. 23 is a diagram showing the image data after the reduction of resolution;

FIG. 30 is a diagram showing how pixels correspond to dot size represented by multi-value data;

FIG. 31 is a diagram showing the dot image which reflects the process of selecting the largest dot;

FIG. 33 is a diagram showing the contents of a conversion table;

FIG. 34 is a diagram showing the dot image which reflects the process of referencing the conversion table;

DESCRIPTION OF THE PREFERRED EMBODIMENTS

Figure 1:
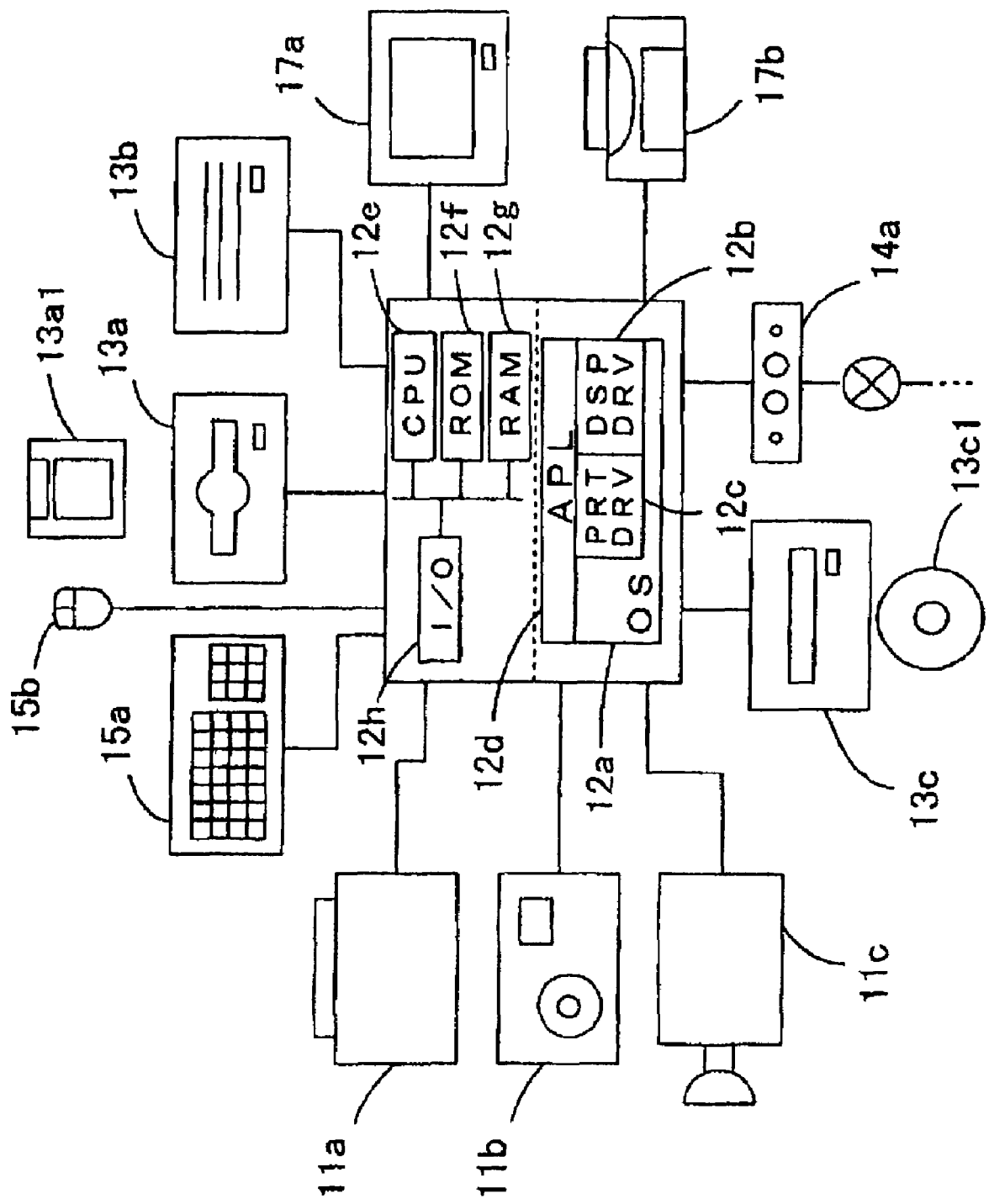
FIG. 1 is a schematic block diagram showing the computer system to implement the printer control program pertaining to one embodiment of the present invention.

The embodiments of the present invention will be described in the following order with reference to the accompanying drawings.
(1) Construction of system hardware
(2) Construction of printer hardware
(3) Outline of the flow of printing process
(4) Process for reducing resolution
(5) Color separation process
(6) Function of the first embodiment
(7) Conclusion
(8) The first modified embodiment
(9) The second modified embodiment
(10) The third modified embodiment
(11) The fourth modified embodiment
(12) The fifth modified embodiment
(13) The sixth modified embodiment
(14) The seventh modified embodiment
(15) The eighth modified embodiment
(16) Additional modified embodiments (1) Construction of System Hardware FIG. 1 is a block diagram showing the computer system used to implement the printer control program pertaining to the first embodiment of the present invention.

The computer system 10 is equipped with image input devices, including a scanner 11a, a digital still camera 11b, and a video camera 11c. The image input devices are connected to the computer proper 12. Each image input device generates image data which represent images with pixels arranged in a dot matrix array and send them to the computer proper 12. The image data can produce about 16.7 million colors with 256 tones for RGB primary colors.

The computer proper 12 is equipped with external auxiliary storage devices including a flexible disk drive 13a, a hard disk drive 13b, and a CD-ROM drive 13c. The hard disk 13b stores major programs relating to the system. The flexible disk 13a1 and CD-ROM 13c1 store programs to be read out as required.

The computer proper 12 is also equipped with a modem 14a (as a communications device) for connection to external networks through public communication lines through which to download software and data. Construction in this example is such that modem 14a accesses outside via telephone lines. Another construction is possible in which access to the network is made via the LAN adaptor. In addition, the computer proper 12 is equipped with a keyboard 15a and a mouse 15b for its operation.

Moreover, the computer proper 12 is equipped with image output devices, including a display 17a and a color printer 17b. The display 17a has a display area consisting of 1024 pixels in the horizontal direction and 768 pixels in the vertical direction, each pixel being capable of producing 16.7 million colors. This is a mere example; the resolution may be 640×480 pixels or 800×600 pixels, may be modified as required.

For an image to be entered through the image input device and to be sent to the image output device, the computer proper 12 has programs to be implemented therein. The most basic among these programs is the operating system (OS) 12a. The operating system 12a contains the display driver (DSP DRV) 12b to cause the display 17a to show an image and the printer driver (PRT DRV) 12c to cause the color printer 17b to perform printing. These drivers 12b and 12c are dependent on the kind of the display 17a and the color printer 17b; therefore, the operating system 12a may be supplemented or modified so that the drivers suit specific equipment. With modified drivers, some equipment may realize more functions than standard one. In other words, the operating system 12a realizes additional functions with the standard, common system.

For implementation of these programs, the computer proper 12 is equipped with CPU 12e, RAM 12f, ROM 12g, and I/O 12h. The CPU 12e performs arithmetic by using the RAM 12f as a temporary work area, a setting memory area, or a program area. It also implements the basic program written in the ROM 12g and controls the external and internal equipment connected through the I/O 12h.

The application 12d is implemented on the operating system 12a as the basic program. The application 12d works in various ways; it monitors the operation of the keyboard 15a and mouse 15b as the operating device, it controls external equipment adequately and implements arithmetic, it shows the results of processing on the display 17a, and it sends the results to the color printer 17b.

The color printer 17b receives as print data the result of processing by the application 12d through the printer driver 12c, and it then forms dots on the print paper with color inks, thereby printing corresponding characters and images.

(2) Construction of Printer Hardware

Figure 2:
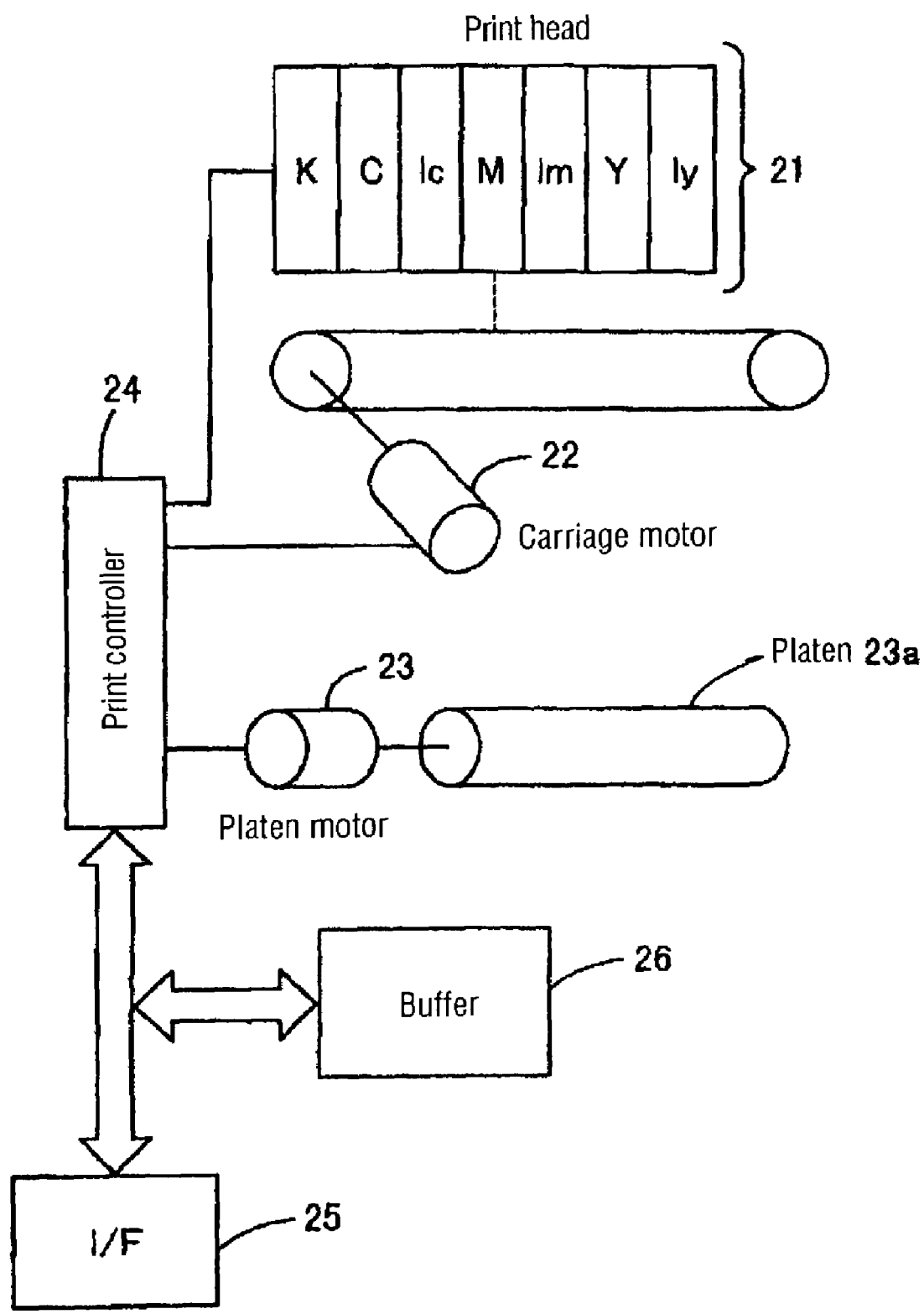
FIG. 2 is a schematic block diagram showing the color ink-jet printer.

FIG. 2 is a schematic diagram showing the construction of the color printer 17b. The print head 21 has a plurality of nozzle columns for individual color inks. These nozzles squirt ink droplets to accomplish printing. The print head 21 is capable of reciprocal movement in the widthwise direction of the print paper by a mechanism (not shown). This transverse movement is accomplished by the carriage motor 22 which turns in the prescribed direction. The print paper is pressed against the platen 23a and is fed as much as necessary as the platen motor 23 is turned in the prescribed direction. The drive in the paper feed direction is referred to as sub-scanning.

The print head 21, the carriage motor 22, and the platen motor 23 are connected to the print controller 24, so that they perform prescribed actions in response to control signals from the printer controller 24. The printer controller 24 is connected to the computer proper 12 through the interface 25. The printer controller 24 acquires print control data from the computer proper 12 through the interface 25 and then controls the print head 21, the carriage motor 22, and the platen motor 23 so that they perform printing in response to the printer control data. Incidentally, the printer controller 24 contains CPU, ROM, RAM, etc.; it also contains the buffer 26 which temporarily stores the print data received through the interface 25. In other words, the buffer 26 reads and writes data according to instructions from the printer controller 24.

Figure 3:
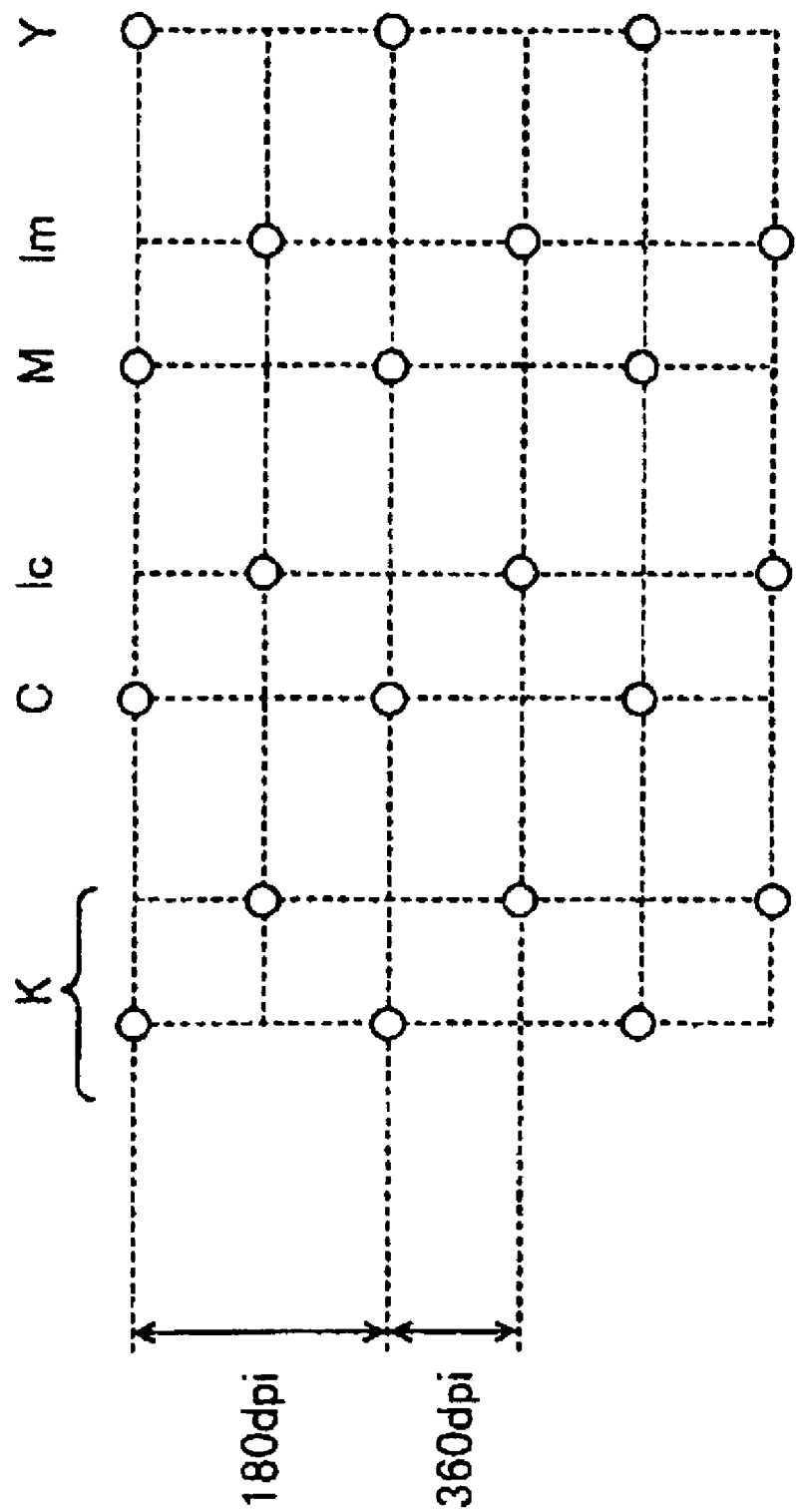
FIG. 3 is a diagram showing the nozzle arrangement of a color ink-jet printer.

FIG. 3 is a diagram showing the nozzle surface of the print head 41. The nozzles are arranged in the horizontal and vertical direction on a plane. Individual columns of nozzles are supplied with different color inks. In this case, two columns are supplied with black ink (K) and the remaining columns are individually supplied with cyan ink (C), light cyan ink (lc), magenta ink (M), light magenta ink (lm), yellow ink (Y), and light yellow ink (ly). Two adjacent columns are paired, and nozzles in each column are arranged at an interval of 180 dpi. Nozzles in one column are offset from those in its adjacent column by a distance corresponding to 360 dpi.

Therefore, nozzles for black ink accomplish 360-dpi printing by one print head traverse, and nozzles for other color inks accomplish 360-dpi printing by two print head traverses. The color printer 17b (in its high-resolution mode) receives 360-dpi print data and prints characters in monochrome with black ink by one print head traverse or perform color printing with color inks by two print head traverses. The number of print head traverses may be altered adequately according to the printing mode.

Figure 4:
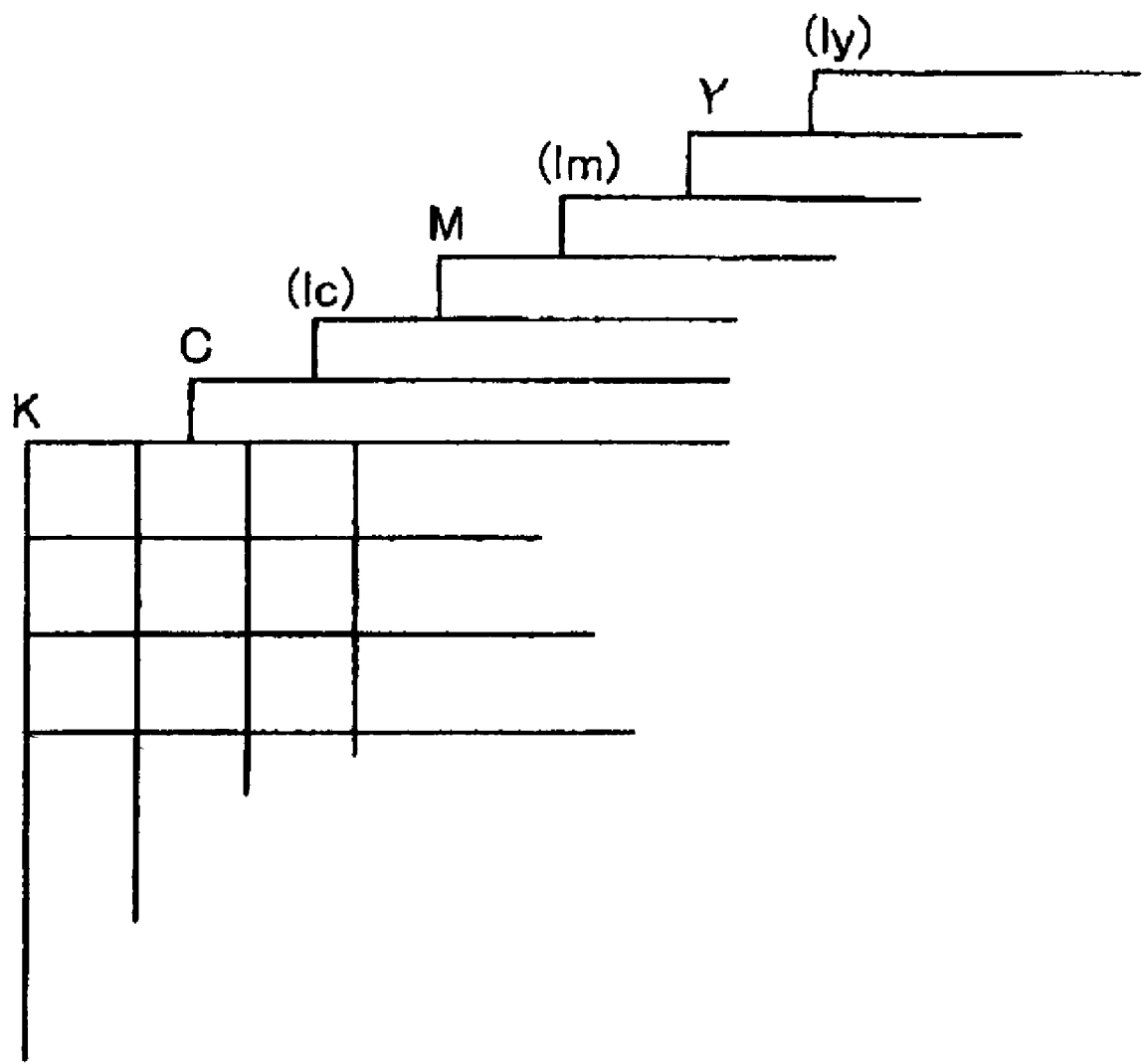
FIG. 4 is a diagram showing the bit map data corresponding to individual color inks.

FIG. 4 is a diagram showing the bit map data corresponding to individual color inks which is created by the printer driver 12c to cause the print head 41 to squirt color inks. This bit map data consists of binary data to determine whether or not each color ink should be squirted onto pixels arranged in a dot matrix array according to the desired printing resolution. The data is divided into each plane for each color.

Incidentally, although two color inks (dark and light) are used for magenta, cyan, and yellow in this example, it is possible to use only one ink for yellow. In this case, two nozzle columns may be used for one yellow ink.

(3) Outline of the Flow of Printing Process

Figure 5:
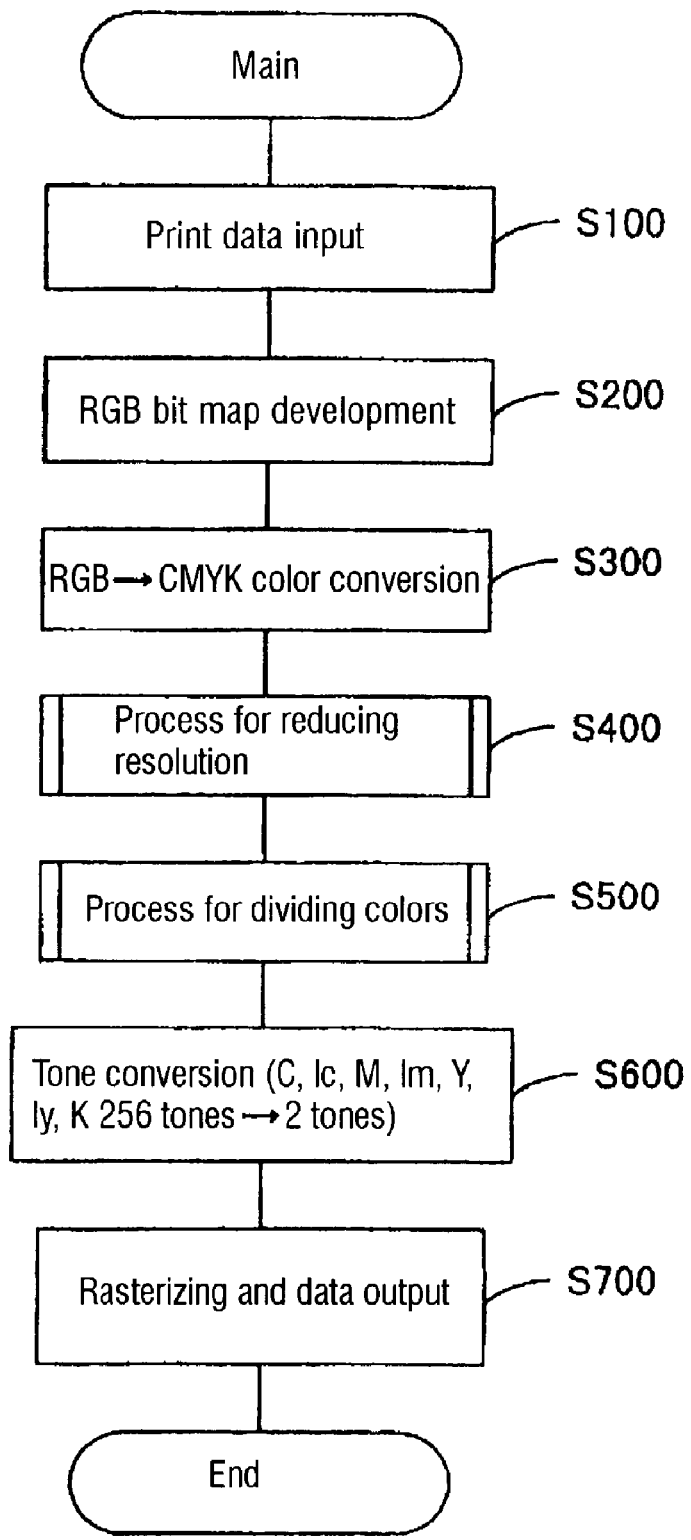
FIG. 5 is a flowchart showing the printing control pertaining to the first embodiment of the present invention.

In color printing with the color printer 17b, the printer driver 12c receives from the operating system 12a the print data corresponding to 360 dpi if high-resolution printing is specified. However, in this embodiment, the printer has the high-speed printing mode, which is briefly explained below with reference to FIG. 5.

The printer driver 12c receives print data in command level from the operating system 12a (in step S100), develops the print data into bit map data in the RGB space (in step S200), and converts the bit map data into data in the CMYK space for individual pixels (in step S300). This color transformation is executed by using a three-dimensional LUT with interpolation.

Then, the printer driver implements the process of reducing resolution (in step S400) and divides cyan, magenta, and yellow into their respective dark color ink and light color ink. In this stage, pixel data is created which represent 256 tones for each of cyan ink (C), light cyan ink (lc), magenta ink (M), light magenta ink (lm), yellow ink (Y), light yellow ink (ly), and black ink (K). The printer driver 12c converts data for 256 tones into data for 2 tones (in step S600) and rasterizes the data in correspondence with the nozzles in the print head 21 and outputs the print data (in step S700).

The process in high-speed print mode does not perform conversion from RGB into C, lc, M, lm, Y, ly, and K, but it does conversion into CMYK first and then performs the process for reducing resolution and the process for color division. These two steps are explained in the following.

(4) Process for Reducing Resolution

Figure 6:
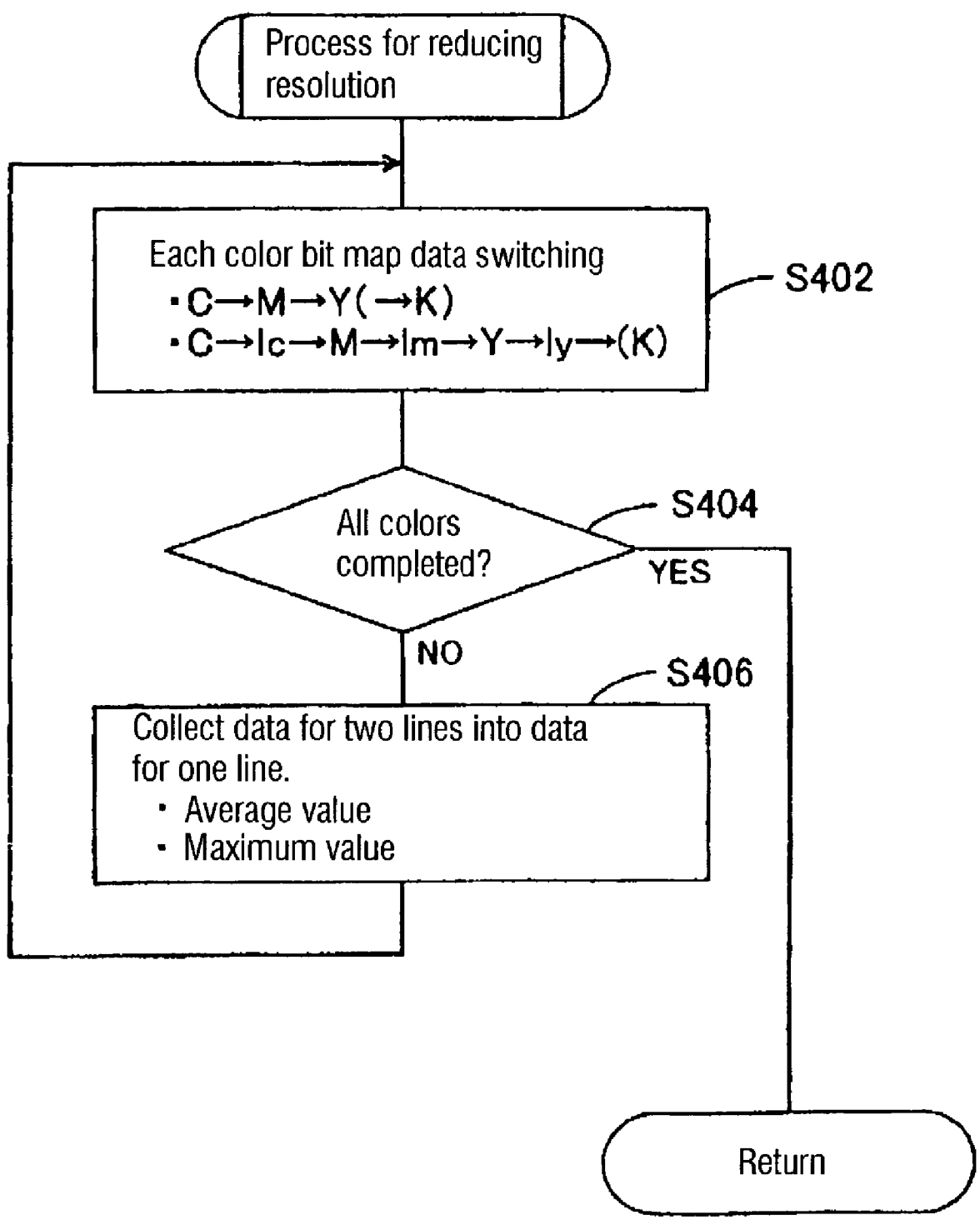
FIG. 6 is a flowchart for the process of reducing resolution.

FIG. 6 shows a flowchart of the process for reducing resolution. This process reduces resolution for the image data for cyan, magenta, and yellow, for which there are no nozzles corresponding to 360 dpi, in such a way that pixels forming two lines are converted into pixels forming one line.

The process issues instructions to switch colors (in step S402) and converts data for two lines into data for one line by referencing the bit map data for each color (in step S406) until the completion of color switching is confirmed (in step S404).

The above-mentioned process may be expressed as follows, assuming image data for 640×480 pixels.

$$D1(i,j) = \{D0(i,j) + D0(i,j+1)\}/2$$

where, i and j denote pointer variables, i changing through a loop of 0-639 and j changing through a loop of 0-240, and D0(x,y) denotes the original data and D1(x,y) denotes the converted image data.

In other words, the process calculates average values when it converts the image data for two lines into the image data for one line. The process for reducing resolution is carried out basically for cyan, magenta, and yellow. In principle, this process is not necessary for black; but there is no need to preclude it. Nevertheless, this process is effective if it is applied to black ink to be divided into two black inks K1 and K2 (differing in darkness) for nozzles in two columns.

FIG. 7 shows a concrete example of the process for reducing resolution. The upper part shows the image data for 360 dpi, which consist of two adjacent lines (odd and even). The image data shown has three columns to which paired numeral values are assigned as 140-100, 255-155, and 128-0. The average values for these paired values are 120, 205, and 64 as shown in the middle part.

In the meantime, the above-mentioned process adopts average values to give priority to tone. It is also possible to adopt maximum values when the image data for two lines is converted into the one for one line.

That is,
D0 (k,j)≧D0 (i,j+1) is converted into
D1 (i,j)=D0 (i,j), and
D0 (i,j)<D0 (i,j+1) is converted into
D1 (i,j)=D0 (i,j+1)

If average values are adopted when image data for two lines are converted into image data for one line, there is the possibility that an underline (represented by image data for one line) disappears or changes into a broken line. This trouble can be avoided by adopting maximum values. The reason why troubles with underlines can be avoided by adopting average values is that the image data represent the so-called ink darkness at this point. In other words, a large numerical value in image data means a large amount of ink to be squirted. The same effect is expected by adopting minimum values in the case where a large numerical value in image data means a large quantity of light.

The lower part of FIG. 7 shows the result which was obtained when maximum values are adopted. The paired values 140-100, 255-155, and 128-0 (in the upper part) give 140, 255, and 128, respectively.

Whether to adopt average values or maximum values depends on whether the print images are characters or ordinary images.

After the process for reducing resolution, data representing 360 dpi remain for black color and data representing 180 dpi remain for cyan, magenta, and yellow colors.

(5) Color Separation Process

Figure 8:
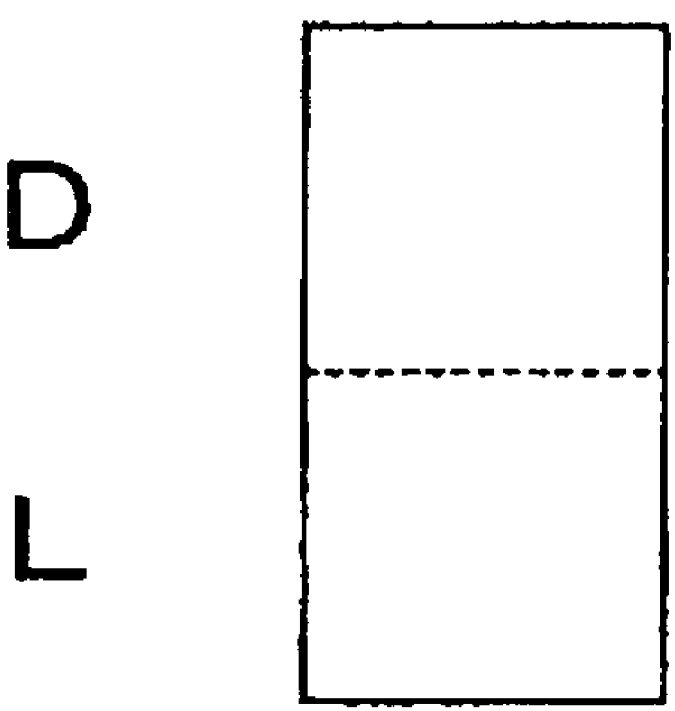
FIG. 8 is a diagram showing how to represent one pixel by arranging a dark ink and a light ink in the vertical direction.

The printer in this embodiment has dark inks and light inks that permit printing corresponding to 360 dpi, except for black ink, as mentioned above. Nozzles for these inks are offset from each other by a distance corresponding to 360 dpi. Therefore, these nozzles arranged in the vertical direction can produce one pixel whose horizontal length corresponds to 360 dpi and whose vertical length corresponds to 180 dpi, as shown in FIG. 8. In this case, ink darkness differs in top and bottom in one pixel as a matter of course. Therefore, it is impossible to form a desired pixel with dark ink. However, it is possible to accomplish printing with two nozzles by a single print head traverse. This procedure is potentially useful for high-speed printing in view of the fact that usually there is a tradeoff between printing speed and image reproducibility.

Figure 9:
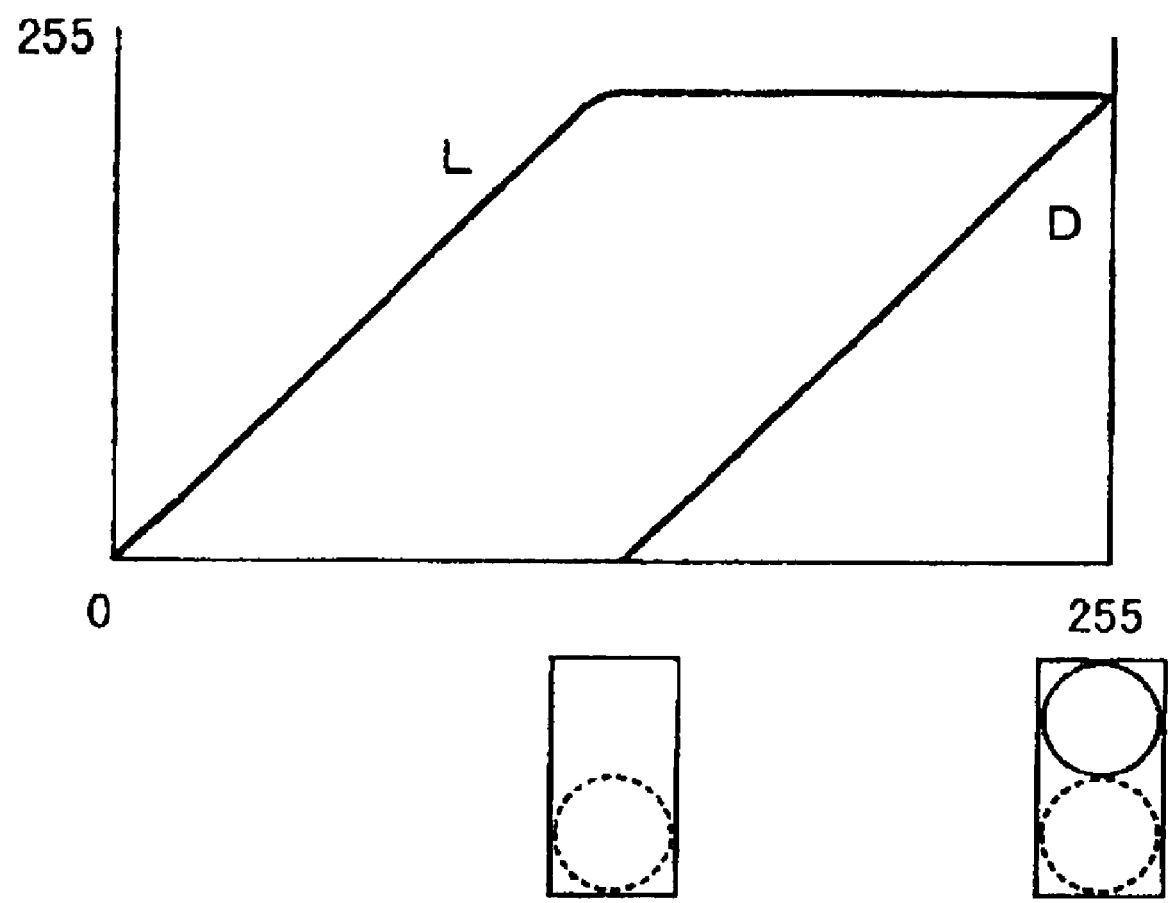
FIG. 9 is a diagram showing the color separation table which corresponds to the number of sections differing in darkness.
Figure 10:
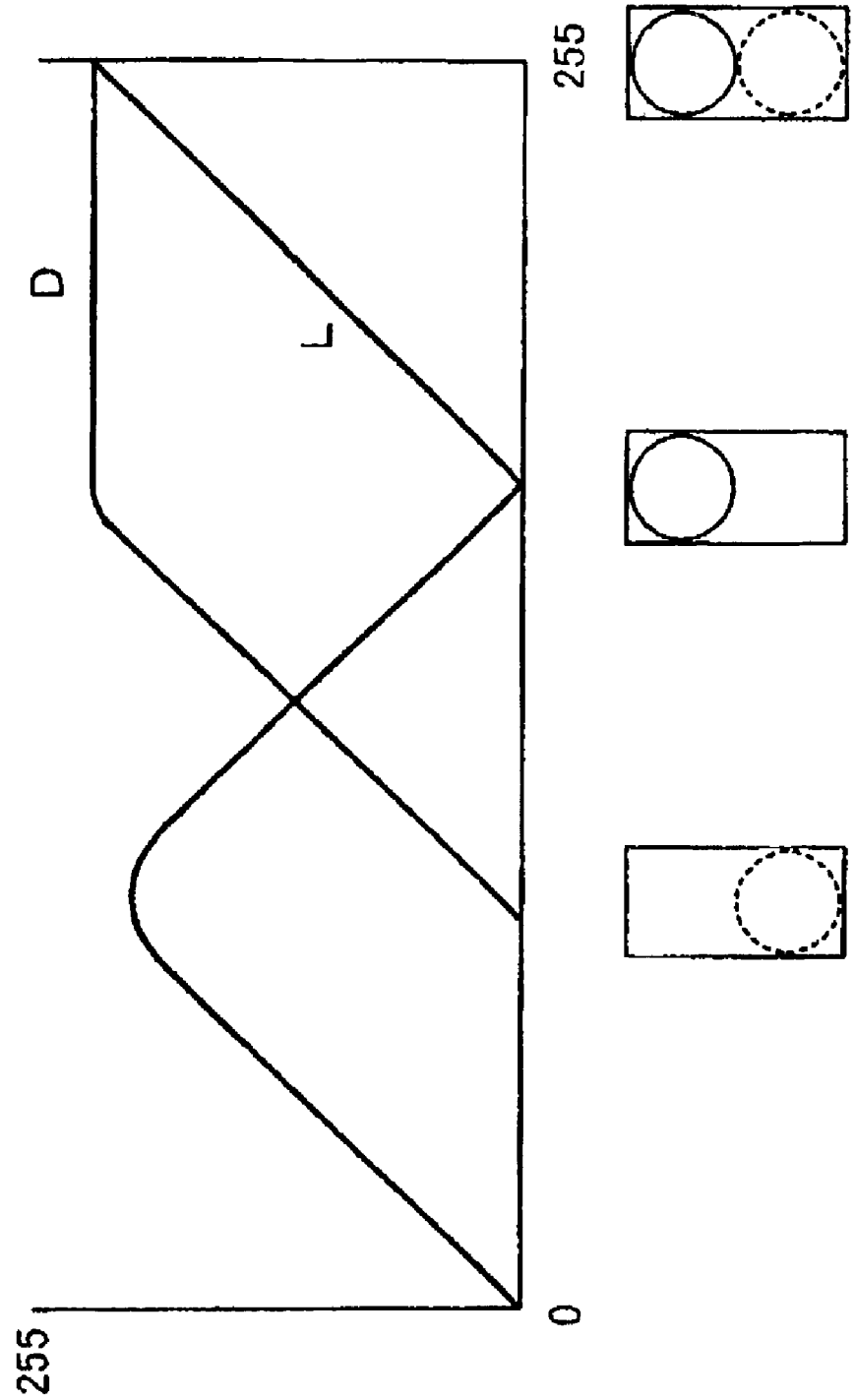
FIG. 10 is a diagram showing the color separation table prepared according to the combination of sections differing in darkness.

In printing a pixel of 360×180 dpi, there are two possible ways to divide one color ink into dark one and light one. This is schematically shown in FIGS. 9 and 10. In the diagram, the left side represents ink darkness "0" and the right side represents ink darkness "255".

In the first example, the darkness of light color ink increases until it reaches the maximum value, and then the darkness of dark color ink begins to increase. Thus, the darkness of light color ink remains at the maximum value while the darkness of dark color ink is increasing. Therefore, this procedure may be referred to as the color division process which depends on the number of steps of darkness.

In the second example, the darkness of light color ink increases until it reaches the maximum value. Then, the darkness of dark color ink begins to increase and the darkness of light color ink gradually decreases until it reaches the minimum value. When the darkness of dark color ink reaches the maximum value, the darkness of light color ink increases again, with the darkness of dark color ink remaining at the maximum value. Eventually, both the darkness of dark color ink and the darkness of light color ink reach the maximum value. Therefore, this procedure may be referred to as the color division process for more than one darkness which depends on the combination of steps of darkness.

Figure 11:
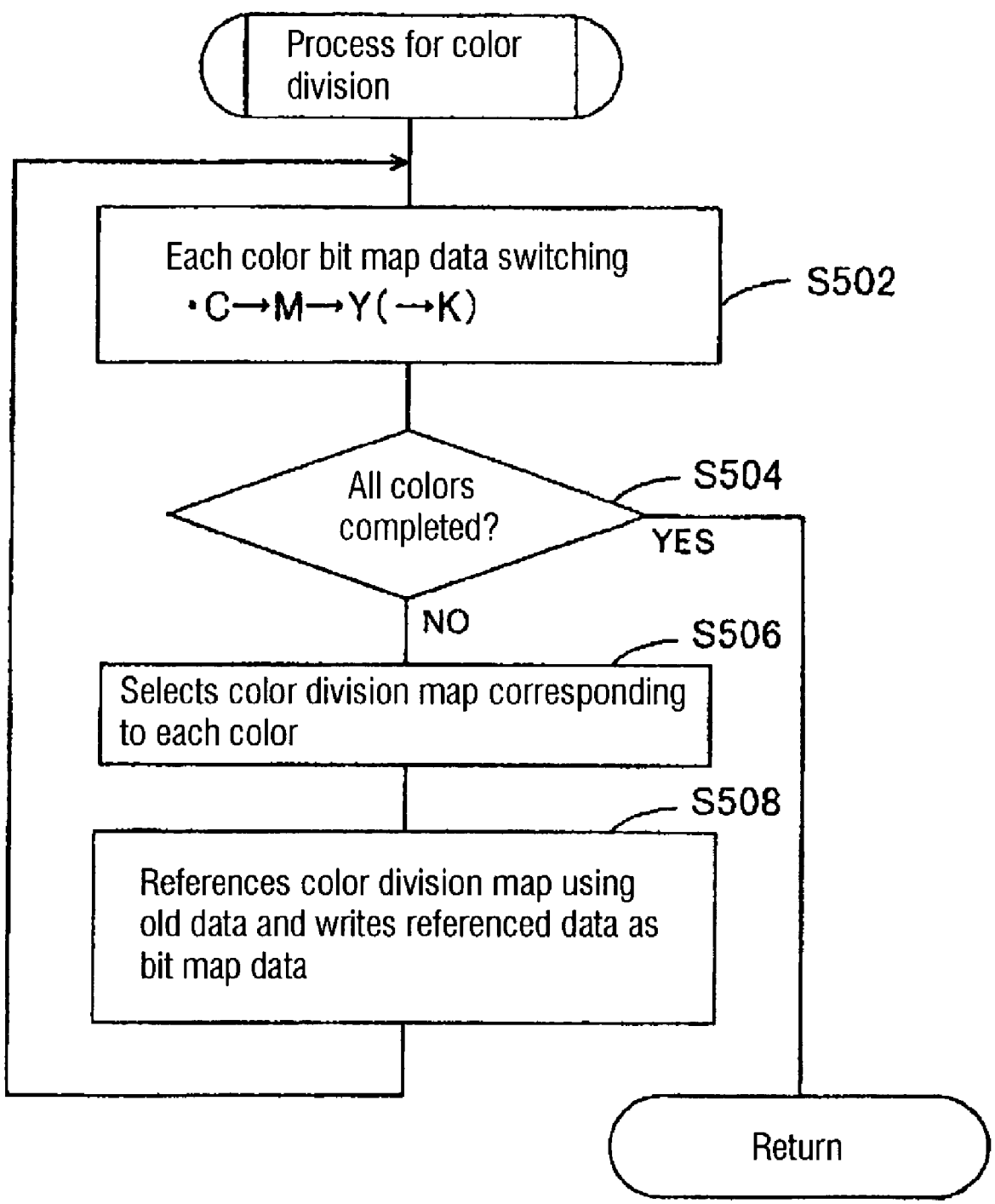
FIG. 11 is a flowchart for the color separation process.

FIG. 11 shows a flowchart of the color division process.

In step S502, an instruction to switch color is given, and the color division process proceeds for each color until the completion of the process for all colors is recognized in step S504. In step S506, the color separation table for each color is selected. There are different methods for color division as shown in FIGS. 9 and 10. A tuned map is necessary to prevent tone jumping, and map data for each color is selected. The structure of the map data is shown in FIG. 12. This map data is a table for referencing light color data (L) and dark color data (D) in response to the data of one color to be referenced. In step S508, this table is referenced by old data in the bit map data, and the referenced light color data (L) and dark color data (D) are written as new bit map data for two colors.

At this stage, the bit map data for 360 dpi is created for black ink (K) and the bit map data for 180 dpi is created for each of cyan ink (C), light cyan ink (lc), magenta ink (M), light magenta ink (lm), yellow ink (Y), and light yellow ink (ly).

Since each of the bit map data still has the data for 256 tones, it is converted into data for 2 tones in step S600 before printing. The data is rasterized in step S700 and output as the print data corresponding to each nozzle in the print head 21.

(6) Function of the First Embodiment

Figure 13:
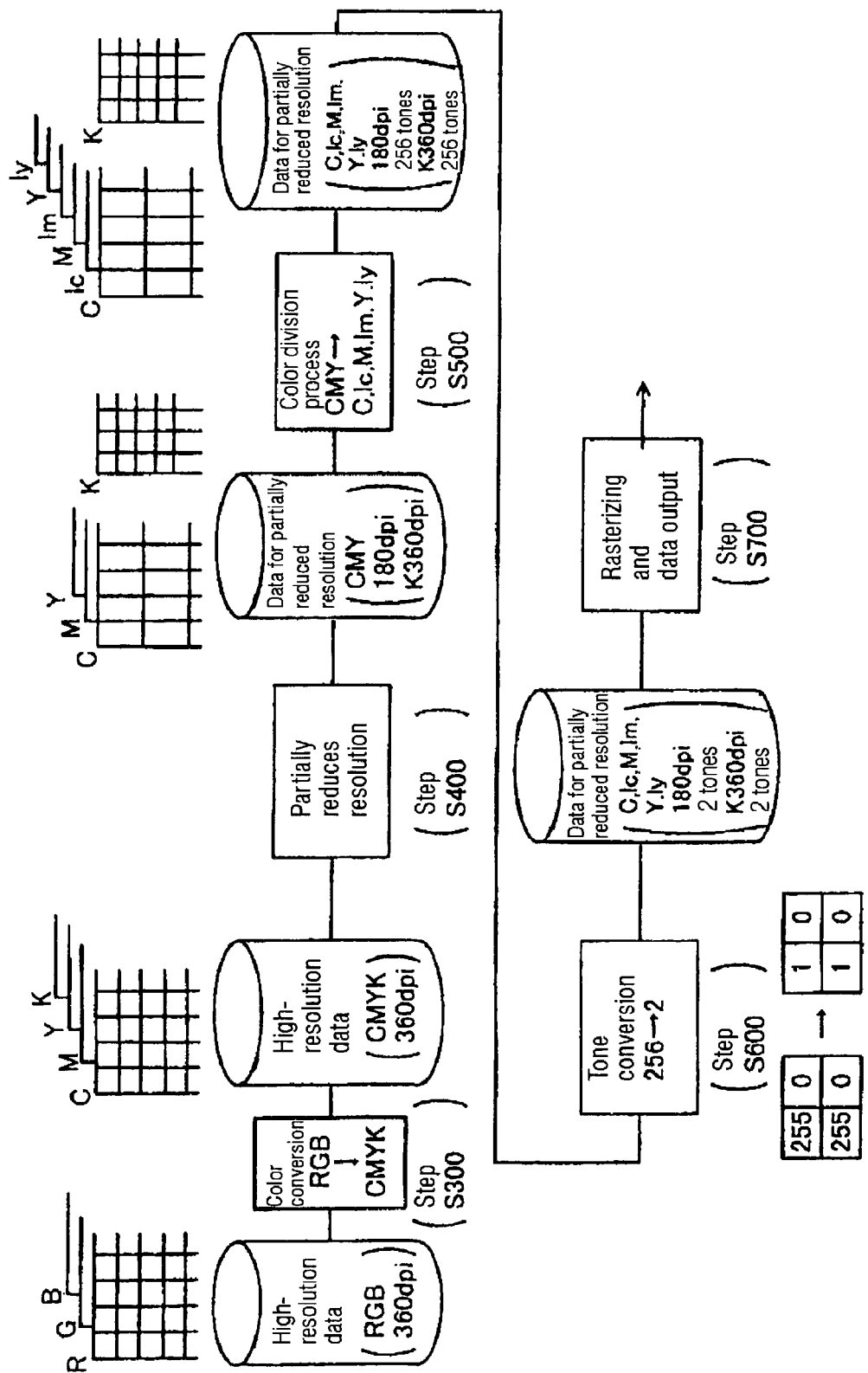
FIG. 13 is a schematic diagram showing the process of printing control.

At the time of high-speed printing mentioned above, one which the operating system 12a outputs to the printer driver 12 is print data for 360 dpi in 256 tones for each RGB color. This will be explained below with reference to FIG. 13.

Upon receipt of this print data by the printer driver 12c (in step S100), the print data is developed into RGB bit map data (in step S200) and then color-converted into the CMYK color space (in step S300).

Then the process for reducing resolution is executed to reduce image data for two lines (for cyan, magenta, and yellow, except for black) into image data for one line (in step S400). The data for each color is divided into data for dark color ink and light color ink according to the color separation table for each color (in step S500).

This procedure yields bit map data of 360 dpi in 256 tones for black ink and also yields two kinds of bit map data (dark color and light color) of 180 dpi in 256 tones for each of cyan, magenta, and yellow.

After that, tone conversion from 256 tones to 2 tones is carried out to give dot on-off data (in step S600), which is rasterized and output to the color printer 17b (in step S700).

Figure 14:
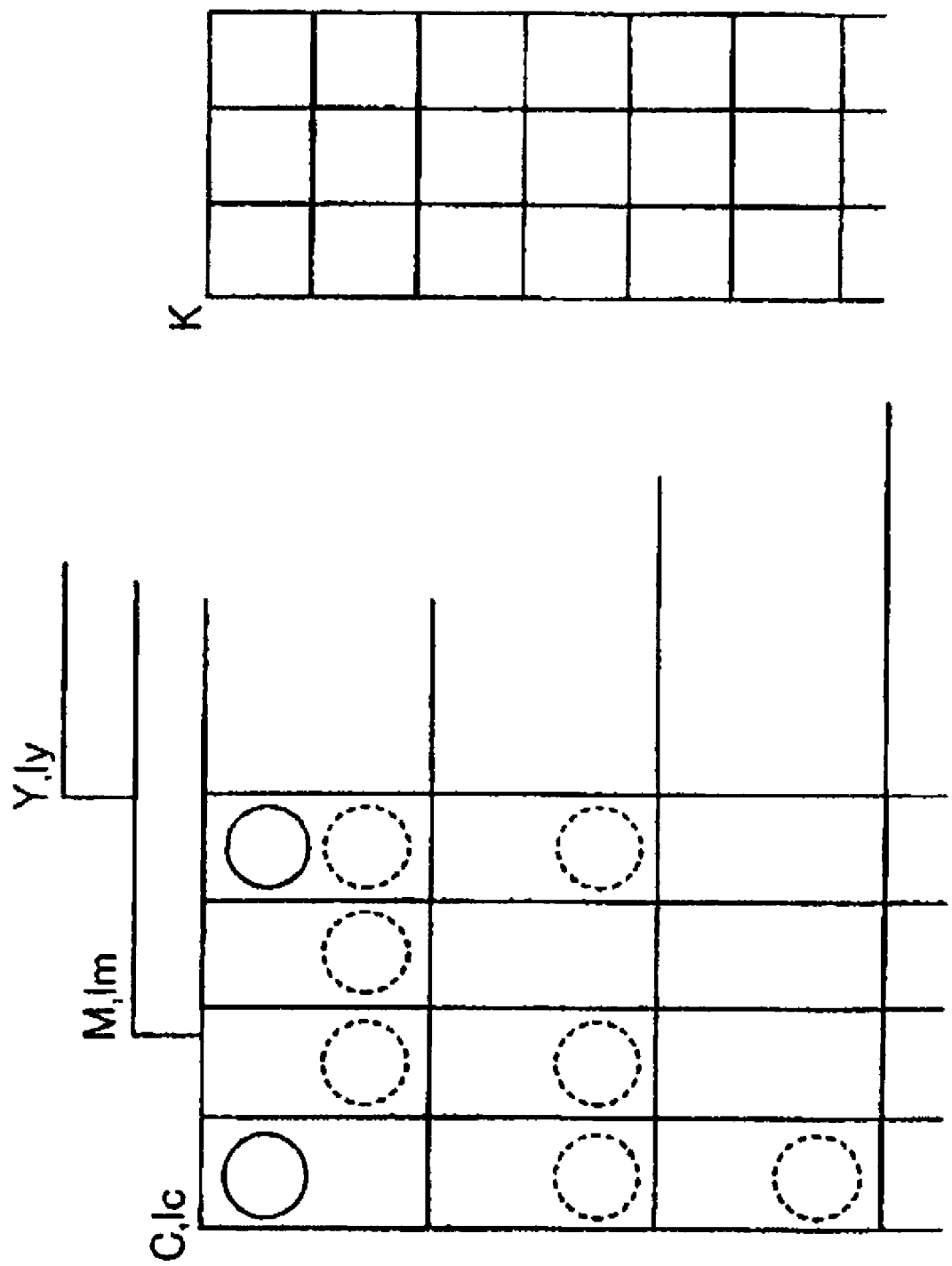
FIG. 14 is a diagram showing how dots are formed in high-speed printing.

Originally, it is expected that the color printer 17b receives two-tone data of 360 dpi and performs printing by two print head traverses. However, high-speeding printing mentioned above is accomplished by one print head traverse with all the nozzles arranged zigzag on the print head 21. FIG. 14 shows pixels for cyan inks (C, lc), magenta inks (M, lm), yellow inks (Y, ly), and black ink (K) in each plane.

Nozzles are arranged zigzag in two columns for black ink (K) as well as other inks of similar color. Drive signals are issued in synchronism with ink squirt corresponding to each pixel so that desired inks are squirted onto pixels arranged in dot matrix array of 360 dpi. In this case, there are two nozzle columns for black ink so that black ink is squirted to desired pixels of 360 dpi regardless of odd lines or even lines. As to other inks of similar color, dark color ink is squirted only for odd lines of 360 dpi and light color ink is squirted only for even colors. Thus, there is an imbalance between pixels receiving dark color ink and pixels receiving light color ink. Nevertheless, it is possible to fill all pixels of 360 dpi by one print head traverse, which leads to increased printing speeds.

In this embodiment, individual nozzles are allotted to vertically adjoining pixels, or pixels with reduced resolution are formed by nozzles squirting dark color inks and light color inks. Therefore, low-resolution pixels are formed by a plurality of nozzles belonging to each section assuming the use of a plurality of nozzles so divided as to squirt color inks differing in darkness.

(7) Conclusion

According to this embodiment, it is possible to realize high-speed printing by reducing the number of print head traverses to squirt ink droplets onto pixels for high resolution, although the color printer 17b used in this embodiment originally has a plurality of nozzles arranged zigzag which are capable of squirting dark color ink droplets and light color ink droplets onto one pixel. The improvement is achieved by the process of reducing resolution (step S400), in which data is manipulated so as to combine pixels in adjoining two lines, and the color division process (step S500), in which nozzles for dark color ink and nozzles for light color ink squirt ink droplets onto each of pixels in two lines such that two pixels for two lines are handled as one pixel.

(8) The First Modified Embodiment

In this modified embodiment, the color separation in step S500 is omitted. Instead, the data of 180 dpi for each color of cyan, magenta, and yellow, which was created in step S400, replaces the data of each dark color ink.

The omission of the color separation process helps increase the printing speed further. This is effective particularly in the case where the computer proper 12 is equipped with a CPU 12e limited in processing capability. This is also effective in reducing graininess of light color ink, although good color reproducibility is obtained only with dark color ink unless graininess is concerned. In addition, this reduces printing cost by an amount necessary for light color ink. However, FIG. 14 indicates that dark color ink droplets are squirted to only odd lines of 360 dpi. In the case of solid printing, ink droplets are slightly larger than pixels of 360 dpi, but there is the possibility that slight banding occurs in even lines. Even in this case, it is possible to reduce banding if control to enlarge ink droplets is available.

(9) The Second Modified Embodiment

In the above-mentioned embodiment, color transformation from the RGB color space into the CMYK color space is accomplished first and then the color separation is performed individually on cyan, magenta, and yellow. These processes involve the referencing of the LUT, and the processing in this way needs table referencing twice. The second modified embodiment obviates the necessity of referencing the LUT twice.

Figure 15:
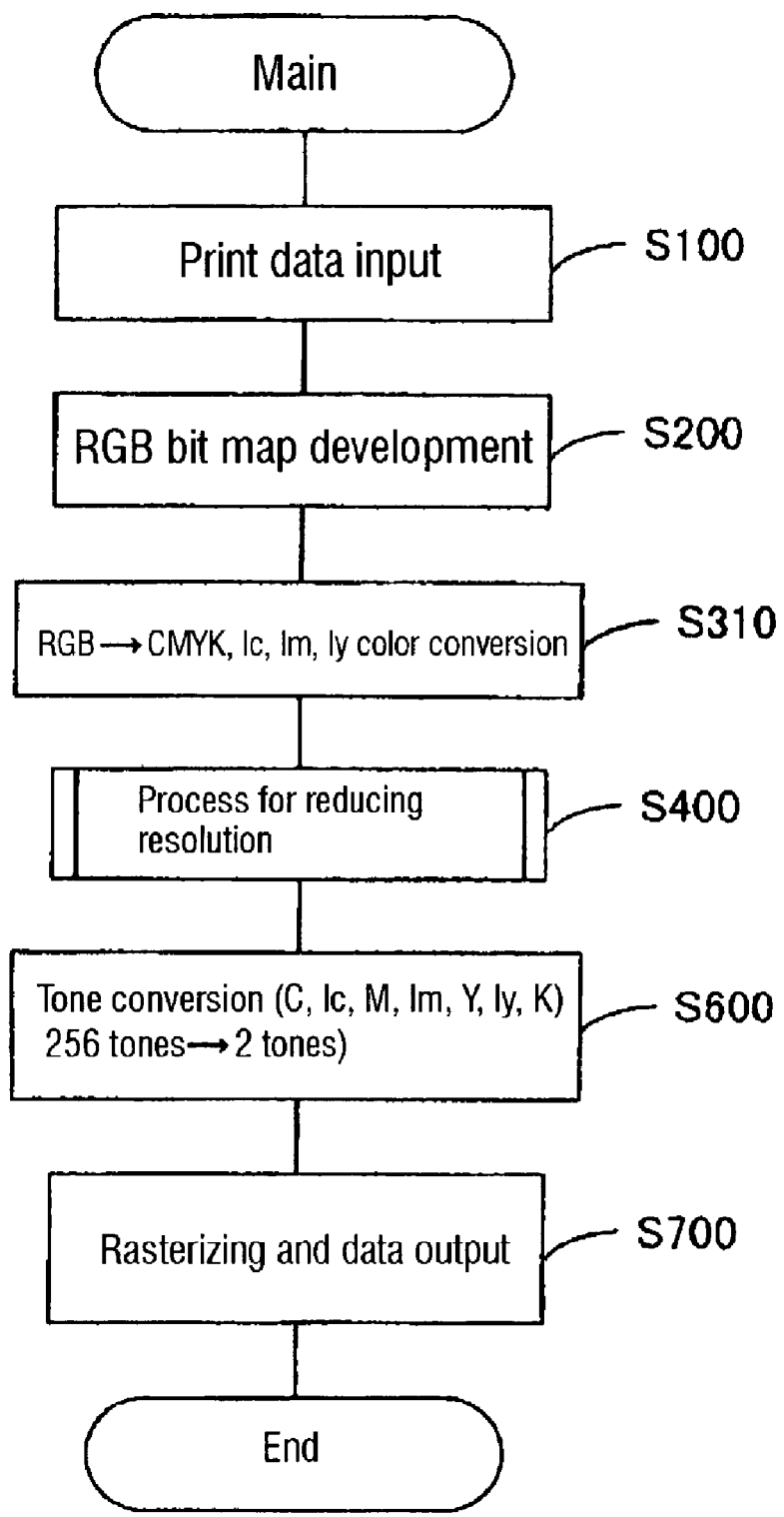
FIG. 15 is a flowchart showing the printing control pertaining to the second modified embodiment.

FIG. 15 is a flowchart showing the second modified embodiment. Print data is entered in step S100 and then developed into bit map data for the RGB space in step S200. Based on the RGB image data, color transformation into seven colors in total (cyan, magenta, yellow, light cyan, light magenta, and light yellow) is accomplished in step S310, unlike the preceding embodiment. The LUT used here may be constructed by combining the LUTs used before. In other words, if there is an LUT for color transformation from RGB to CMYK, a new LUT can be constructed by previously referencing respective LUTs for C→C,lc, M→M,lm, and Y→Y,ly for all combinations. In this way, it is possible to achieve color transformation at once from RGB into the seven colors.

After the completion of color transformation in this manner, the process for reducing resolution is carried out in step S400 in the same way as mentioned above. Then, tone conversion is carried out in step S600 (without the process for color separation), and rasterizing and data output are carried out in step S700.

A comparison is made below between the second modified embodiment and the original embodiment. The second modified embodiment is usually advantageous to printing speed, because the frequency of referencing the LUT has been reduced from twice to once. On the other hand, it is necessary to perform the process for reducing resolution also on the bit map data for light-color inks and this increases the number of steps. Thus, the advantage to printing speed would be offset under certain conditions.

Moreover, the second modified embodiment is not advantageous to tone reproduction. It is noted from FIG. 7 that the image data for 360 dpi has the values of "140" and "100", and these values have their optimal color separation values. Color division is not a mere calculated value of ink darkness. In actual, it is subtly tuned to prevent tone jump; therefore, the relationship is not necessarily linear. However, the image data obtained from average values, with emphasis on tone, is "120". So long as the process for color separation lacks the linear relationship, the value of color division corresponding to this image data "120" does not necessarily coincide with the result obtained by color division for 360 dpi. Especially, in the case where the process for reducing resolution is carried out by using the maximum value so as to prevent underlines from disappearing, there is a strong tendency toward the degradation of tone.

Therefore, the second modified embodiment is effective if emphasis is placed on speed-up, but the preceding embodiment is effective if it is desirable to prevent the degradation of image quality while intending speed-up.

(10) The Third Modified Embodiment

In the second modified embodiment, either the maximum value or the average value is adopted at all times in the process of reducing resolution, although this procedure can be altered according to conditions. In the third modified embodiment, the value to be adopted is changed according to the darkness of color ink.

Figure 16:
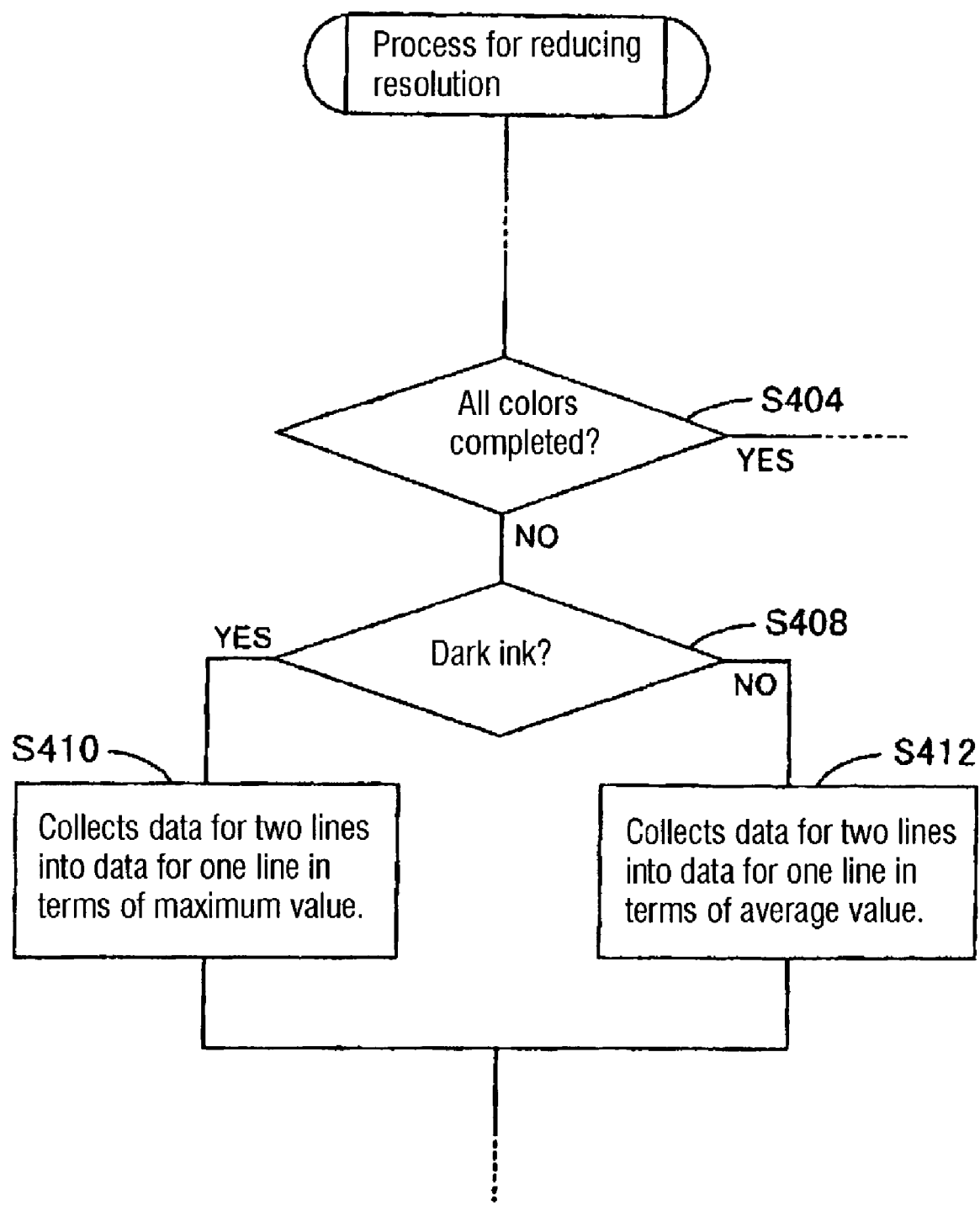
FIG. 16 is a flowchart showing the process of reducing resolution pertaining to the third modified embodiment.

FIG. 16 shows the third modified embodiment. The process therein corresponds to step S406 in the process for reducing resolution which is shown in FIG. 6. As shown in FIG. 16, step S408 judges whether the color ink is a dark color ink or not. In the case of a dark color ink, step S410 adopts the maximum value and carries out the process for reducing resolution. In the case of a light color ink, step S412 adopts the average value and carries out the process for reducing resolution.

That part to which the tone data of a dark color ink is allotted is a dark part, and such a part tends to deteriorate image quality if dots therein disappear as in the case of underline.

On the other hand, that part to which the tone data of a dark color ink is not allotted is regarded as a non-dark part irrespective of whether or not the tone data of a light color ink is allotted. In this case, priority should be placed on the tone properties so as to maintain the image quality rather than on the elimination of banding due to dot disappearance.

Therefore, this modified embodiment is effective which performs the reduction of resolution according to whether or not the color ink is a dark color ink. Incidentally, this modified embodiment employs color inks differing in darkness by two steps. However, its concept can also be applied to the case in which color inks differ in darkness by more than two steps. In this case, the process may be separated according to whether the color ink has the maximum darkness.

(11) The Fourth Modified Embodiment

Figure 17:
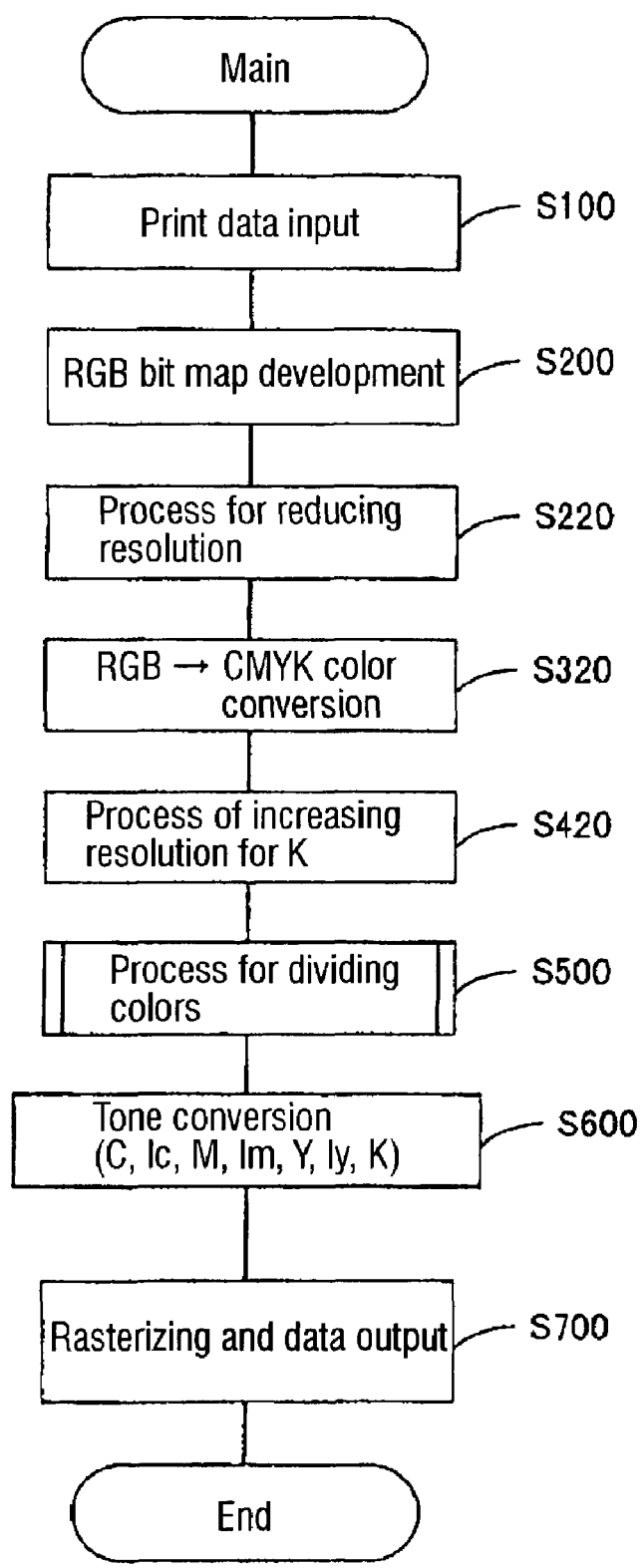
FIG. 17 is a flowchart showing the printer control pertaining to the fourth modified embodiment.

The fourth modified embodiment is designed to perform the reduction of resolution in the RGB color space. FIG. 17 shows a flowchart of the fourth modified embodiment. The print data is entered in step S100 and then developed into a bit map in the RGB space in step S200. The process of reducing resolution is carried in the subsequent step S220. This process is identical to that for the CMY image data in that RGB data of 360 dpi for two lines is developed into image data for one line. In this stage, it is acceptable to adopt an average value to give a preference to tone reproduction, or it is acceptable to carry out the process such that an underline will not disappear afterward. In the latter case, it is necessary to adopt a minimum value in the image data for two lines.

Since the RGB space is a color space where the tone value is proportional with lightness, a large value of the image data indicates a bright color. Thus, the image representing a black underline has a small value. If one does not want an underline to disappear, it is necessary to adopt a minimum value in the image data for two line as mentioned above. FIG. 18 shows the result of conversion in the case where a minimum value is adopted. The data "140", "100", "255", "128", and "0" in the upper line is converted into the data "100", "150", and "0", respectively.

Subsequently, color transformation is accomplished in step S320. In this case, the RGB image data of 180 dpi does not print one pixel simply with one dot but prints one pixel with a dark color ink and a light color ink. Therefore, it is desirable to execute the process of color separation. This is the reason for the color transformation from RGB to CMYK.

However, since nozzles for black color ink correspond to 360 dpi, the process for increasing resolution is performed in step S420 and the process of color separation is performed on CMY in step S500. The color separation table that can be used in this case may be the same one as shown in FIGS. 9 and 10. Then, tone conversion is accomplished in step S600 and rasterizing and data output are accomplished in step S700.

(12) The Fifth Modified Embodiment

The preceding explanation is concerned with the case in which nozzles in two columns are arranged zigzag. The following explanation is concerned with the case in which nozzles in two columns are arranged parallel.

Figure 19:
FIG. 19 is a diagram showing a modified nozzle arrangement.

FIG. 19 shows nozzle columns and ink colors allocated to respective nozzles. Paired nozzles are arranged such that when they squirt ink droplets simultaneously, ink droplets from one nozzle strike a pixel in the odd-numbered line and ink droplets from the other nozzle strike a pixel in the even-numbered line. Since black ink droplets are of the same darkness, they strike pixels in the odd-numbered line and even-numbered line at the same time; there is no need to have them strike twice. By contrast, for other color inks, it is necessary for ink droplets of one color ink to strike pixels twice which have been formed by ink droplets of other color ink. Therefore, even in such an arrangement, black ink can print twice as fast as other color inks.

Figure 20:
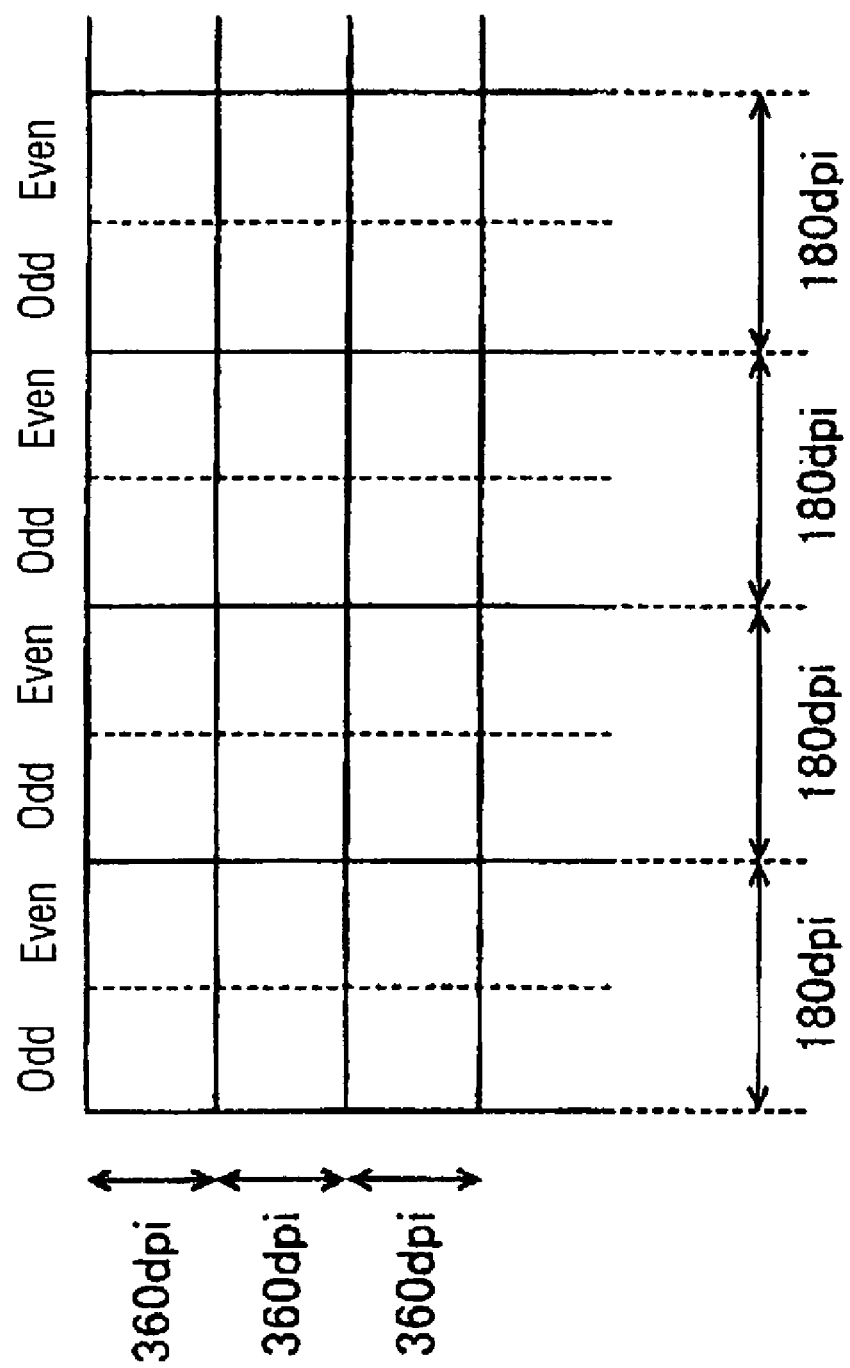
FIG. 20 is a diagram showing how the reduction of resolution is realized in the high-speed printing.
Figure 21:
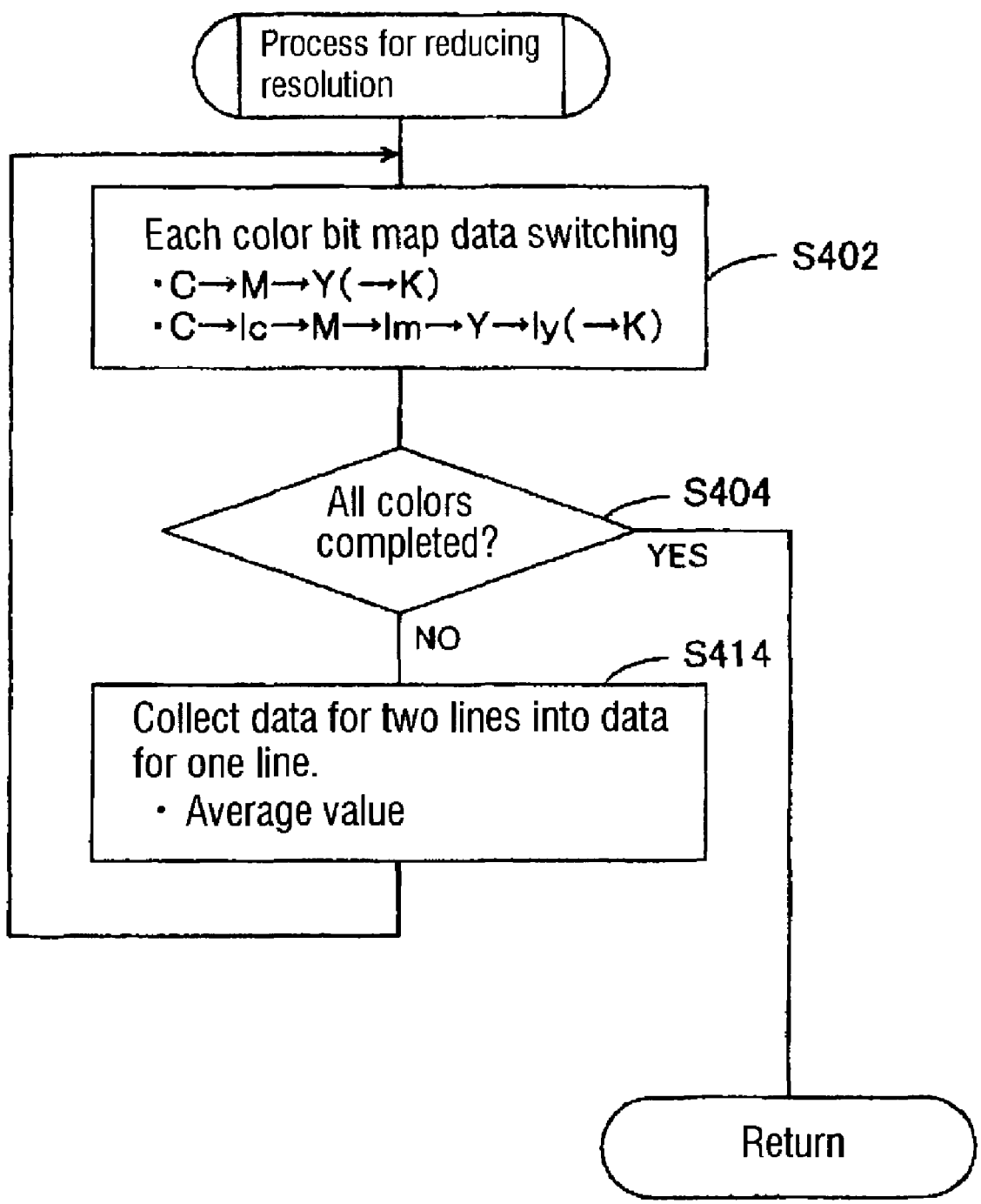
FIG. 21 is a flowchart showing the process of reducing resolution pertaining to the fifth modified embodiment.

In the fifth modified embodiment, over-striking is not performed for any ink except for black ink. In other words, as shown in FIG. 20, the resolution in the line direction is held at 360 dpi, and the odd-numbered pixel and even-numbered pixel in the column direction are handled together as a single pixel, and printing with a resolution of 180 dpi is carried out. The flow of basic processing in this high-speed printing is the same as that shown in FIG. 5; however, the processing for reducing resolution is carried out as shown in step S414. The difference from the process for reducing resolution shown in FIG. 6 is that data for two columns are processed together as data for one column in step S414. In this case it is not necessary to adopt the maximum value.

Figure 22:
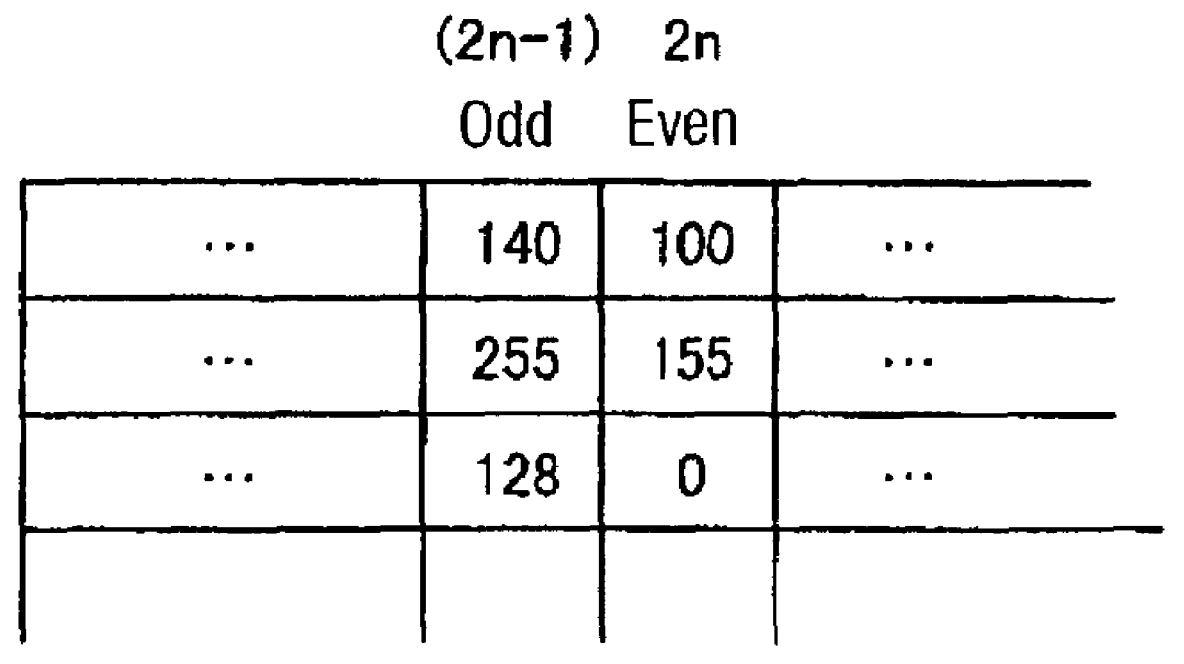
Figure 23:
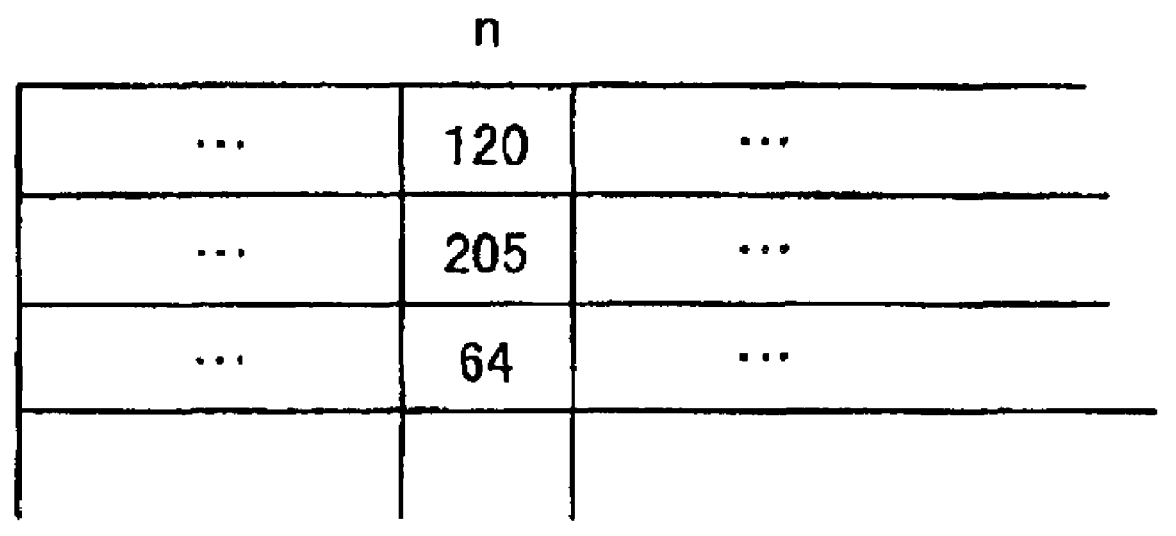

FIG. 22 shows image data of 360 dpi before resolution reduction. It shows image data of odd-numbered columns (2n–1) and image data of ensuing even-numbered columns (2n). FIG. 23 shows image data of 180 dpi after resolution reduction. As the result of combining two-column data into one-column data, the number of pixels in the column direction is halved and the image data of the preceding odd-numbered column (2n–1) and the image data of the even-numbered column (2n) have become the image data of nth column and its value is an average value.

Subsequently, the process for color separation is carried out in step S500. In the above-mentioned embodiment, dark color ink and light color ink arranged vertically are squirted as shown in FIG. 8. In the fifth modified embodiment, dark color ink and light color ink arranged horizontally are squirted as shown in FIG. 20. This difference, however, does not appreciably affect the image quality. Therefore, resolution reduction may be accomplished in the same manner.

Subsequently, tone conversion is performed in step S600, and rasterizing and data output are performed in step S700.

(13) The Sixth Modified Embodiment

In the above-mentioned embodiments, the process of reducing resolution is performed in the stage of 256 tones; however, it is also possible to perform it in the stage of low tone to indicate whether or not to add dots to each pixel. The processing in this stage is easy to perform and permits speed-up.

Figure 24:
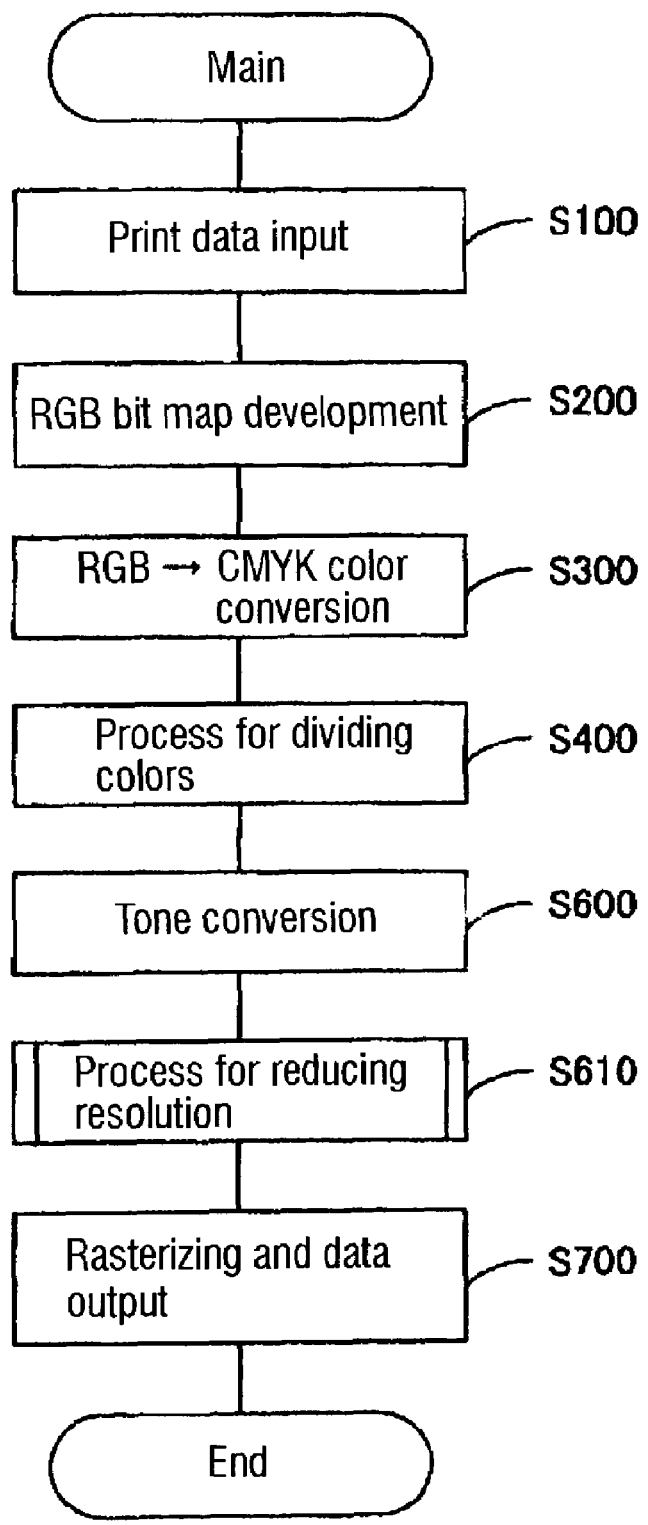
FIG. 24 is a flowchart showing the printer control pertaining to the sixth modified embodiment.
Figure 25:
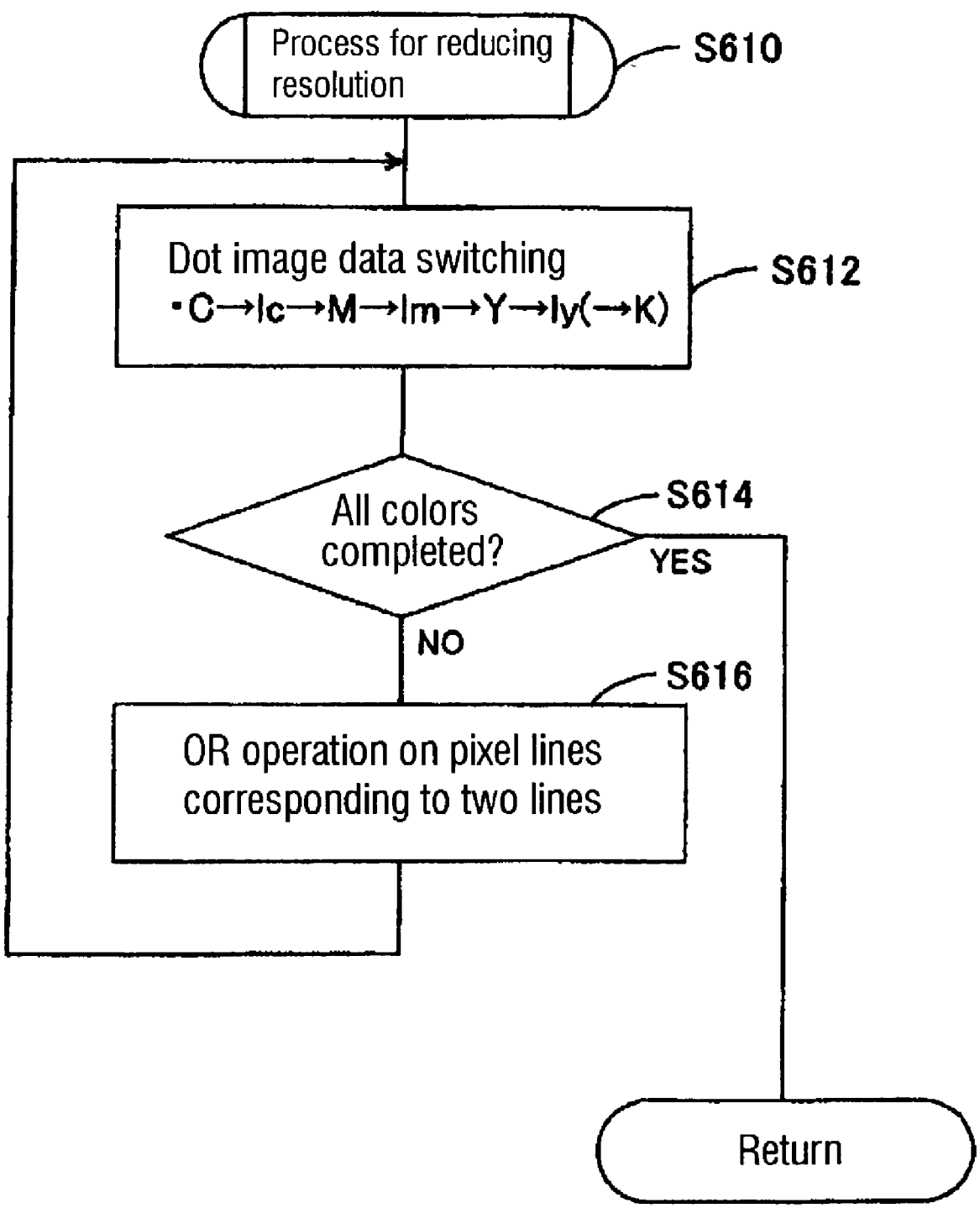
FIG. 25 is a flowchart showing the process of reducing resolution pertaining to the sixth modified embodiment.

FIG. 24 schematically shows a flow of high-speed processing. As shown in the figure, after tone conversion in step S600, resolution reduction is performed in step S610. The image data which has undergone step S600 is binary data which represents whether or not dots should be added to each pixel for each color ink. As shown in FIG. 25, the process of reducing resolution in step S610 is carried out such that the bit image data converted into binary values in steps S612 and S614 undergoes OR operation of binary data for two-line pixels in step S616 while switching colors sequentially.

Figure 26:
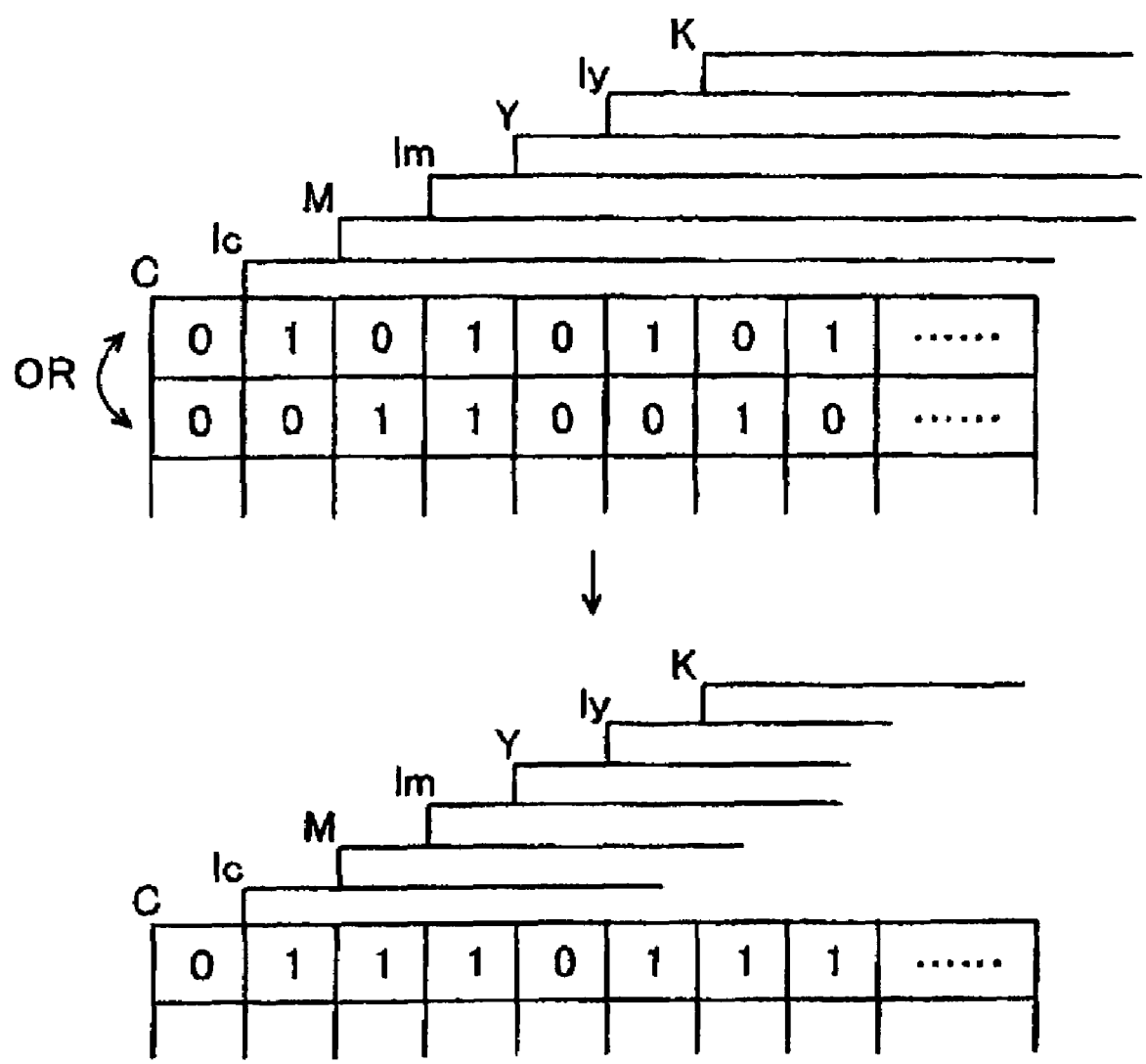
FIG. 26 is a diagram showing the dot image reflecting the process of reducing resolution.

FIG. 26 shows an actual example of OR operation. It is assumed that as a dot image of cyan, data "01010101 . . ." is generated in the first line and data "00110010 . . ." is generated in the second line. OR operation which is performed sequentially (starting from the first bit) yields data "01110111 . . .".

Then, the same operation is performed also on light cyan. Therefore, it follows that resolution reduction is carried out in dot image for each of cyan and light cyan. Thus each takes charge of one pixel line, and two pixel lines are printed with only cyan and light cyan. Needless to way, nozzles arranged zigzag permit printing of two adjacent pixel lines by a single print head traverse.

This OR operation can be executed very rapidly by CPU 12e. Thus, this embodiment contributes to high-speed printing.

(14) The Seventh Modified Embodiment

Figure 27:
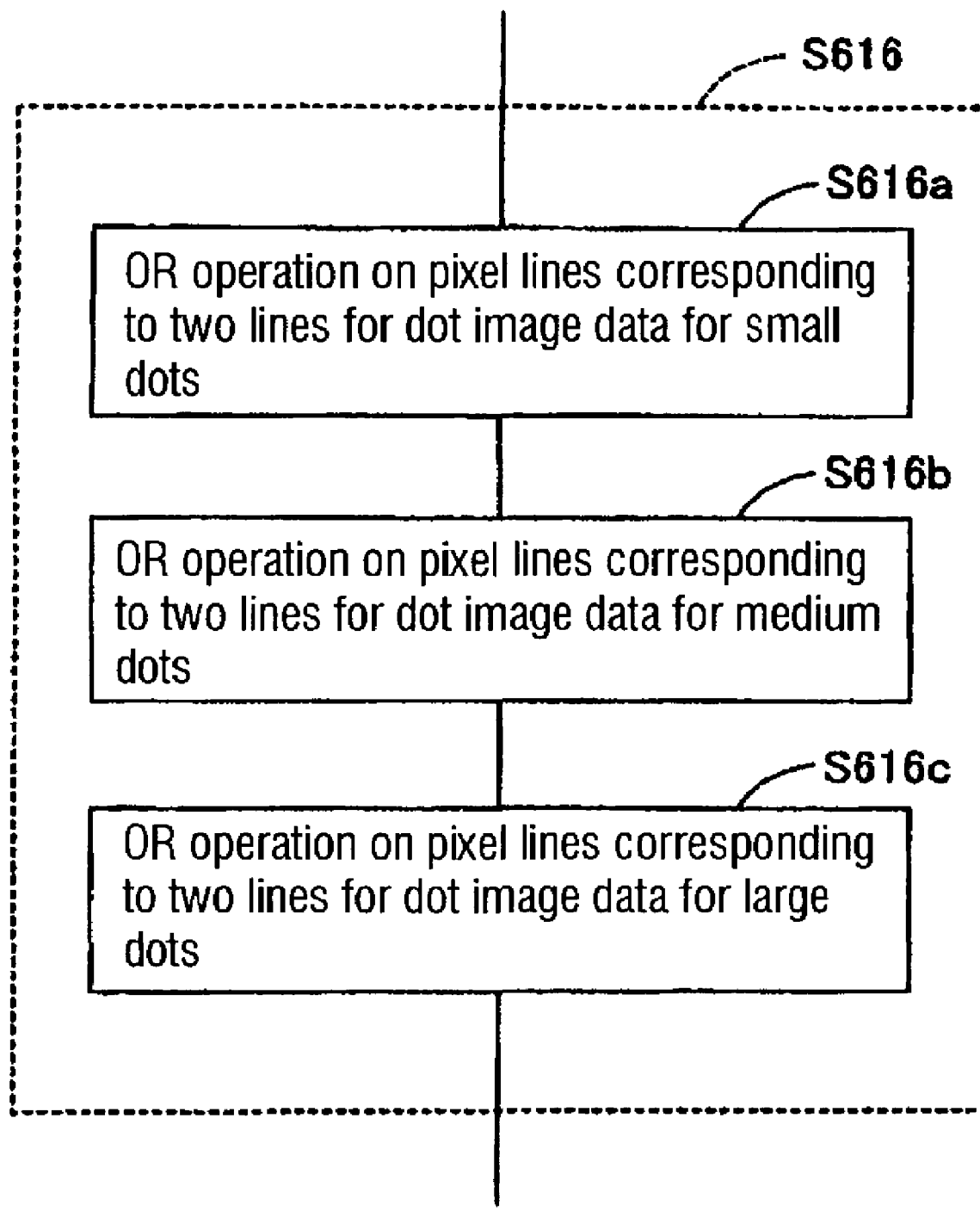
FIG. 27 is a flowchart showing the process of reducing resolution corresponding to a plurality of dot sizes.

In the sixth modified embodiment, operation is performed on the assumption that there is only one kind of dot size. FIG. 27 shows a modified embodiment in which printing is performed with three kinds of dot size (large, medium, and small) and binary data is available for each size.

Step S616 shown in FIG. 25 is shown again in FIG. 27. This step is divided into three substeps: step S616a in which OR operation is performed on dot image data for small dots; step S616b in which OR operation is performed on dot image data for medium dots; and step S616c in which OR operation is performed on dot image data for large dots. Except for these processes, there is nothing different from that shown in FIG. 25.

(15) The Eighth Modified Embodiment

Figure 28:
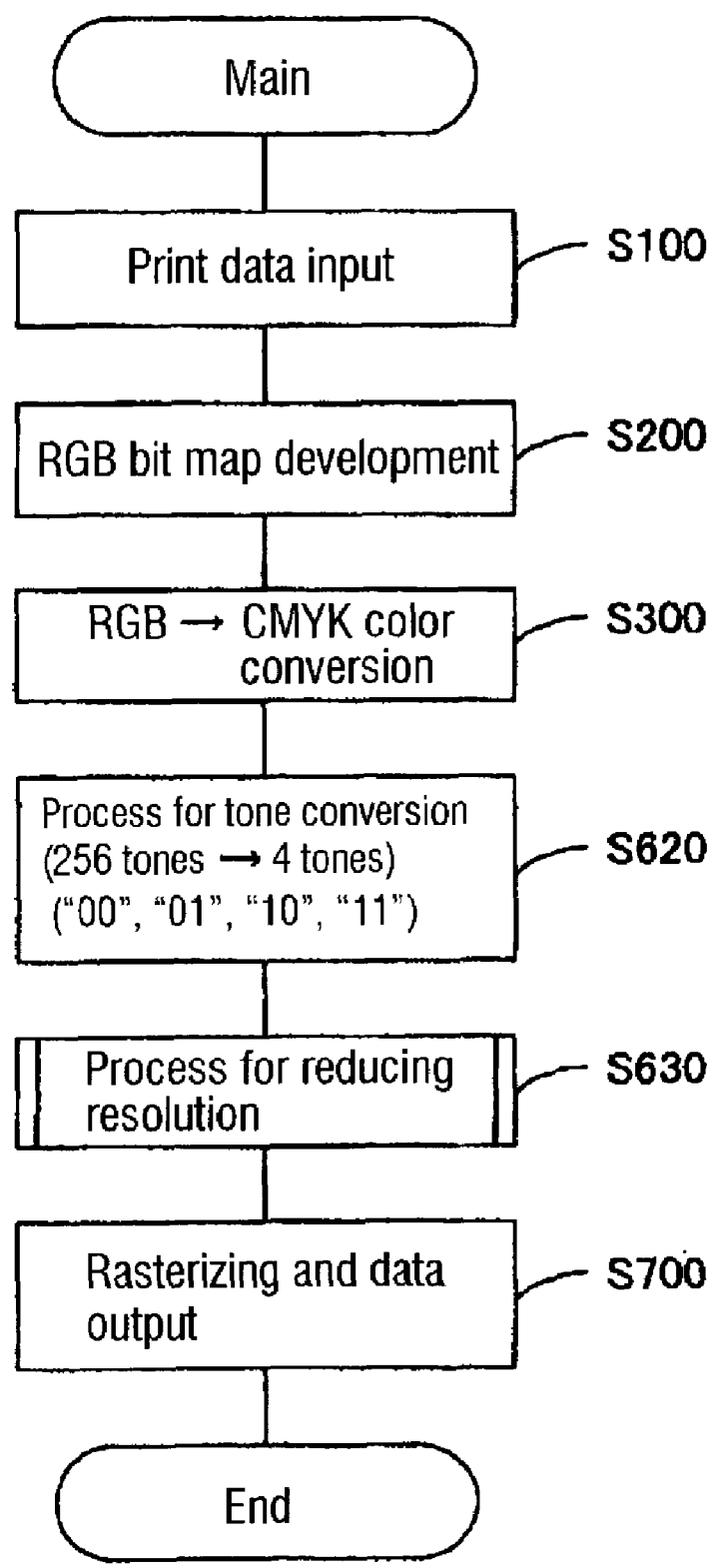
FIG. 28 is a flowchart showing the printing control pertaining to the seventh modified embodiment.

On the other hand, tone reduction includes not only conversion into binary data but also conversion into multi-value data. According to the flowchart shown in FIG. 28, the 256-tone image data is converted into 4-tone image data on the assumption that the printer is capable of squirting ink droplets having three sizes (large, medium, small) as in the case mentioned above. The 4-tone image data can be represented by 2 bits in such a way that "00" corresponds to not-squirt, "01" corresponds to a small dot, "10" corresponds to a medium dot, and "11" corresponds to a large dot. Subsequently, the 4-tone image data undergoes the process of reducing resolution in step S630.

Figure 29:
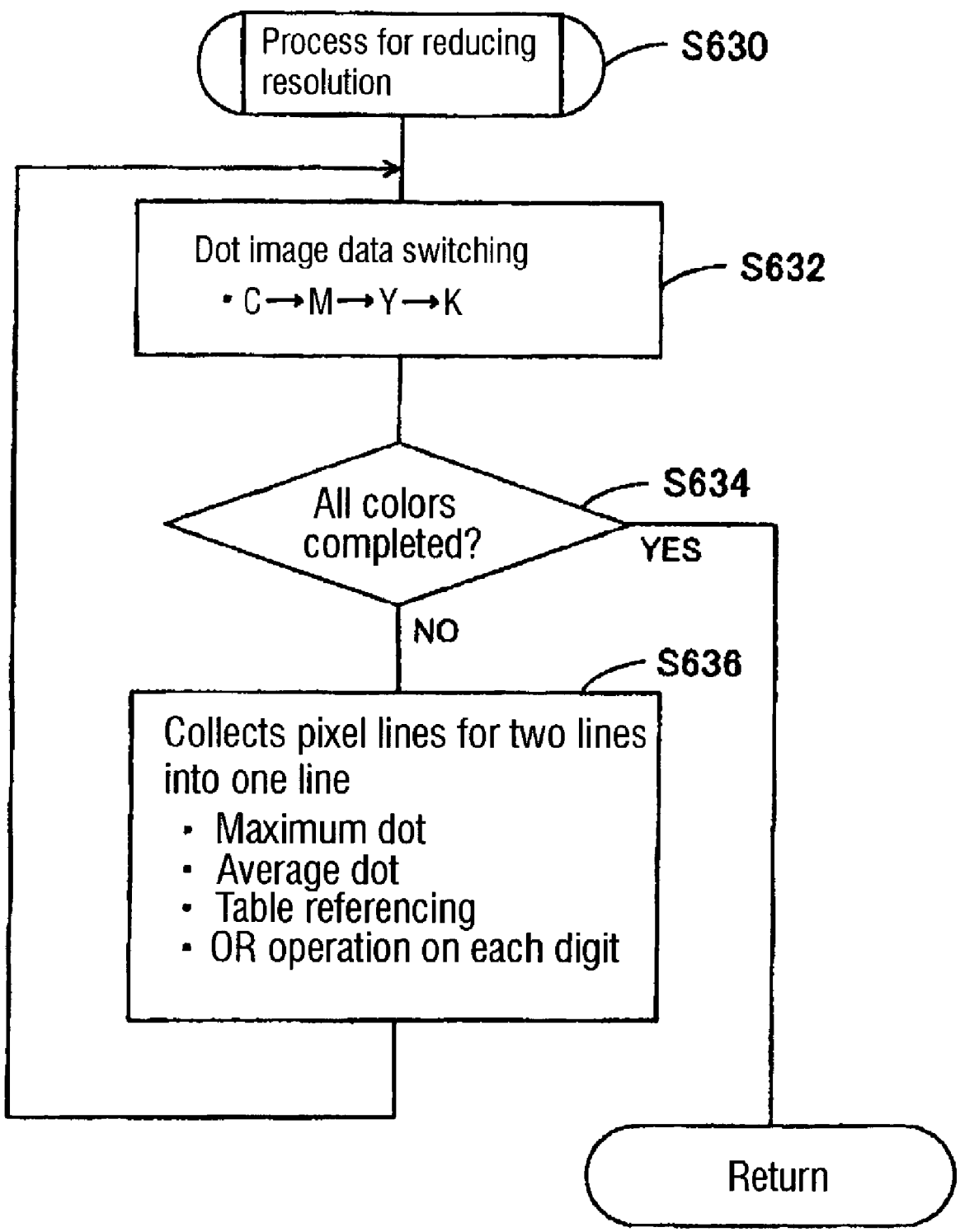
FIG. 29 is a flowchart showing the process of reducing resolution pertaining to the seventh modified embodiment.

The process of reducing resolution in the case of 4-tone image data is also similar to that mentioned above. As shown in FIG. 29, the dot image data undergoes tone reduction in steps S632 and S634, and two pixel lines are combined into one in step S636 sequentially with color switched. Incidentally, since printing is carried out with dot size varied, only one ink darkness is employed in principle.

There are several methods for combining two pixel lines into one as explained below. The one that involves the maximum dot; the one that involves computation of average value; the one that involves table referencing; and the one that involves OR operation for each digit.

It is assumed that the data shown in FIG. 30 is used for demonstration. The dot image of any color ink is represented by the image data for two lines as shown.

FIG. 31 shows the result of selecting the maximum dot in combining two pixel lines into one. This result was obtained by selecting the larger dot for the upper and lower pixels starting from the first pixel. The advantage is that the 2-bit comparison is fast although required judgment.

Figure 32:
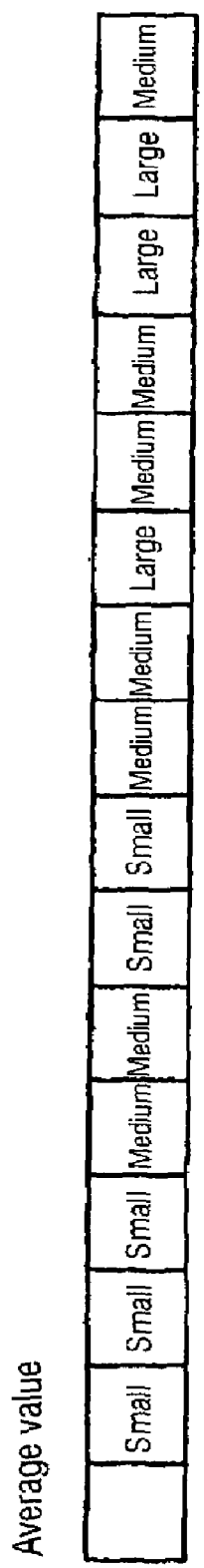
FIG. 32 is a diagram showing the dot image which reflects the process of calculating the average.

Next, FIG. 32 shows the result obtained by the method involving the average value. Albeit average value, round-up computation is accomplished to prevent blurring. For example, the average for non-squirt and small dot is small dot, the average for small dot and medium dot is medium dot, the average for medium dot and large dot is large dot, and the average for non-spry and large dot is medium dot.

This method is effective in the case where it is desirable to maintain tone reproduction; but it slightly reduces speed because of increased computation load.

Incidentally, it is also possible to combine the method involving the average value and the method involving the selection of maximum dot. In other words, it is possible to construct the system in which the methods are switched. To be concrete, judgment is made on whether to select the maximum dot or select the average value when color switching is made; and according to the result the process for combining two pixel lines into one is carried out. In this case the preferable embodiment in general is such that the maximum dot is selected for the dark color ink and the average value is obtained for the light color ink, thereby the dot size is determined. In the case where dark color ink and light color ink are used for the same color, it is desirable to reproduce tones in detail for the light color ink; therefore, it is advantageous to compute the average value although the computing load increases for the light color.

The method involving table referencing carries out the process of reducing resolution by employing the table shown in FIG. 33 which has previously established correspondence. This method is effective in reducing the load of computing the average or in improving print quality. Since the table can be adjusted adequately according to the result of actual printing; therefore, it is possible to improve printing quality by such adjustment. The table referencing is accomplished by arranging 2-bit data in two rows, thereby making 4-bit data, and addressing with the data and reading the corresponding data.

The result shown in FIG. 34 differs from that in FIG. 32 in that there are discrepancies in the $6^{th}$ pixel, $9^{th}$ pixel, and $16^{th}$ pixel.

Figure 35:
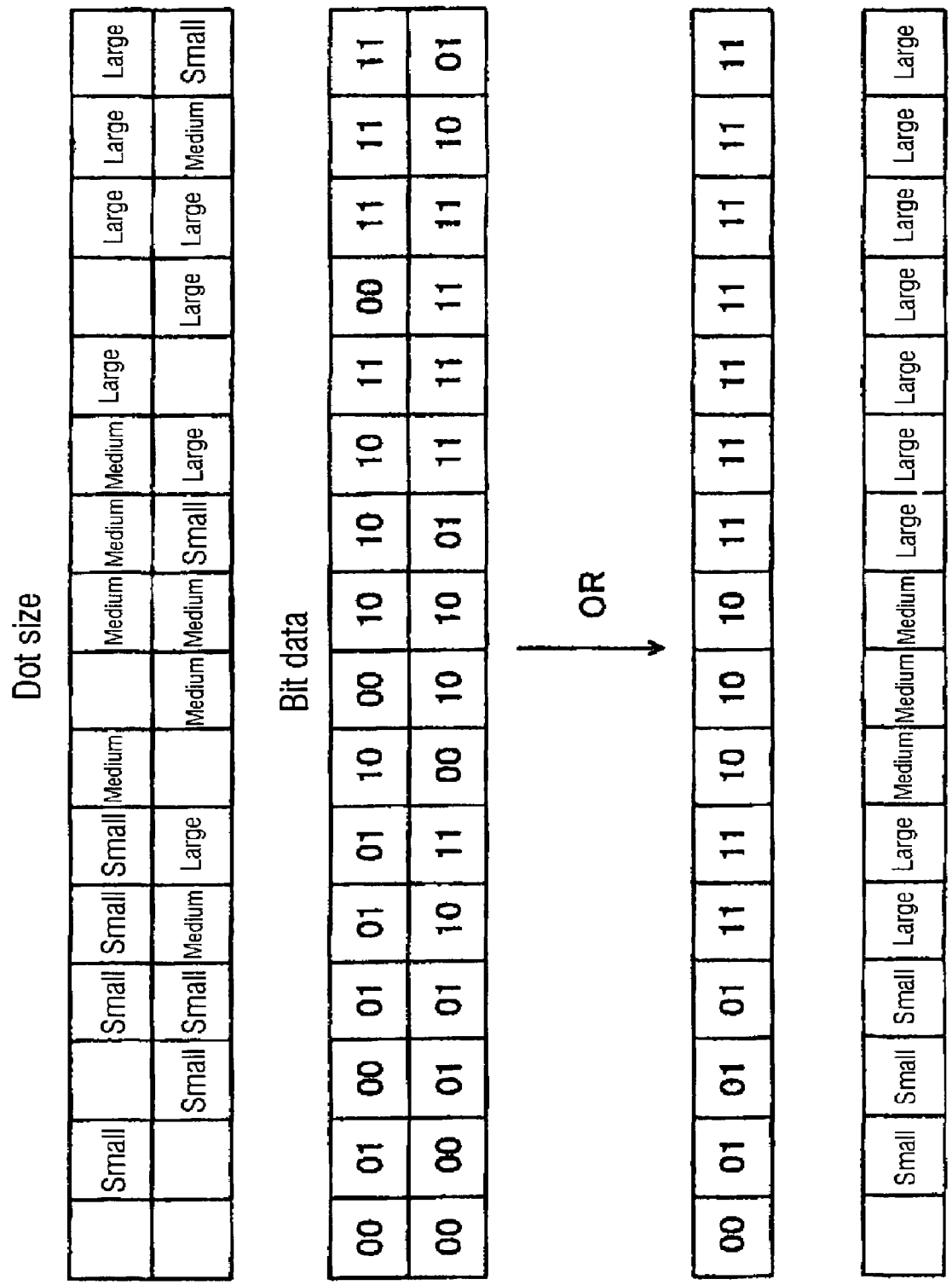
FIG. 35 is a diagram showing the dot image which reflects the process of performing OR operation on each digit.
Figure 36:
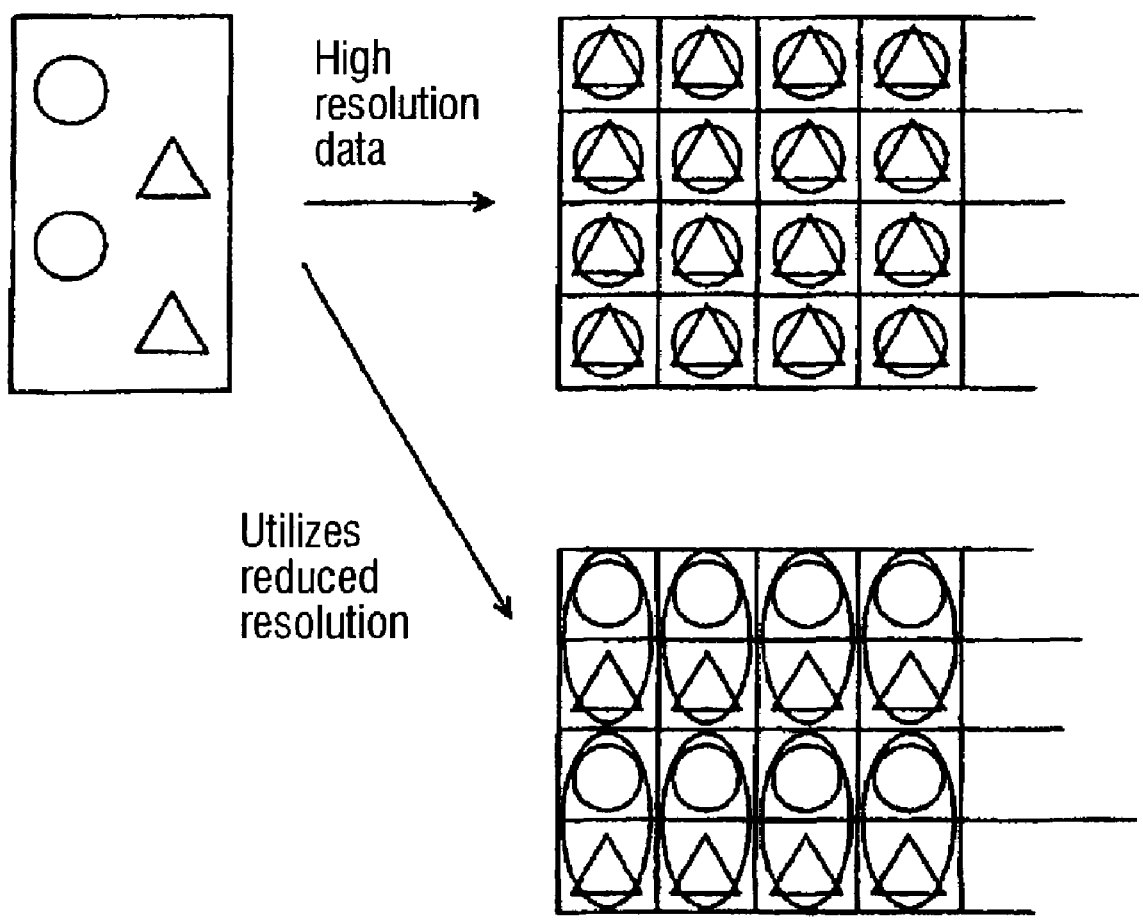
FIG. 36 is a schematic diagram showing how to print high-resolution pixels by converting high-resolution image data into low-resolution image data.

Finally, the method involving the OR operation for each digit is explained in the following. This method is schematically shown in FIG. 35. The correspondence between the pixel and the dot size in high resolution is as shown in FIG. 35. Further, this is shown in terms of 2-bit data. The OR operation is performed on the upper digit and the lower digit for the upper and lower pixels.

This method differs from the one involving the selection of the maximum dot in that there are discrepancies in the $5^{th}$ pixel and $10^{th}$ pixel.

This method permits very rapid processing although there is a possibility of tone deterioration.

(16) Additional Modified Embodiments

The present invention is not restricted to the modified embodiments mentioned above as a matter of course. Moreover, it is also possible to combine them by making use of their characteristic properties, as a matter of course.

I claim:

1. A printer control unit to control printing by a printing apparatus with a plurality of nozzles capable of high-resolution printing which squirt ink droplets onto individual pixels, said printer control unit being configured to create, from high-resolution image data, low-resolution image data in which neighboring pixels in said high-resolution image data are made into one pixel, and squirt ink droplets onto individual pixels for high resolution according to the resulting low-resolution image data, thereby printing low-resolution pixels comprising a plurality of high-resolution pixels, said printer control unit being characterized in that:
    said plurality of nozzles is divided into sections which squirt a plurality of color inks differing in darkness;
    each of said low-resolution pixels is comprised of a plurality of adjacent high-resolution pixels, and the plurality of adjacent high-resolution pixels is squirted with ink droplets according to the low-resolution image data in common; and
    the plurality of nozzles assigned to said plurality of adjacent high-resolution pixels belongs to each of the sections, with each of the sections being assigned with a color ink having a different darkness.

2. The printer control unit as defined in claim 1, wherein the low-resolution image data is created by reducing a number of lines according to the high-resolution image data for a plurality of lines.

3. The printer control unit as defined in claim 1, wherein specific nozzles out of said plurality of nozzles are caused to squirt a color ink with one darkness.

4. The printer control unit as defined in claim 1, wherein a process for color separation is accomplished for a plurality of darknesses that can be formed by a combination of the sections assigned with color inks having a different darkness.

5. The printer control unit as defined in claim 1, wherein a process for color separation is accomplished according to a number of sections into which the plurality of nozzles is divided.

6. The printer control unit as defined in claim 1, wherein, if a number of nozzles allotted to each color is different, resolution is reduced for the color to which a smaller number of nozzles is allotted.

7. A printer control method for output of print data to a printer equipped with a plurality of nozzles capable of high-resolution printing which squirt ink drops onto pixels individually, said printer control method comprising:
    based on high-resolution image data, creating low-resolution image data such that neighboring pixels for high resolution are made into one pixel; and
    based on the resulting low-resolution image data, squirting ink droplets onto pixels for high resolution, thereby printing low-resolution pixels comprising a plurality of high-resolution pixels, wherein each of said low-resolution pixels is comprised of a plurality of adjacent high-resolution pixels, and the printer control method further includes
    dividing a plurality of nozzles into sections which squirt a plurality of color inks differing in darkness; and
    squirting the plurality of adjacent high-resolution pixels with ink droplets according to the low-resolution image data in common, where the plurality of nozzles assigned to said plurality of adjacent high-resolution pixels belongs to each of the sections, with each of the sections being assigned with a color ink having a different darkness.

8. A computer-readable medium storing a printer control program for output of print data from a computer to a printer equipped with a plurality of nozzles capable of high-resolution printing which squirt ink drops onto pixels individually, said medium storing a printer control program comprising:
    program instructions for, based on high-resolution image data, creating low-resolution image data such that neighboring pixels for high resolution are made into one pixel and
    program instructions for, based on the resulting low-resolution image data, squirting ink droplets onto pixels in high resolution, thereby causing the printer to realize the function of printing low-resolution pixels comprising a plurality of high-resolution pixels, wherein each of said low-resolution pixels is comprised of a plurality of adjacent high-resolution pixels, and the printer control program further includes
    program instructions for dividing a plurality of nozzles into sections which squirt a plurality of color inks differing in darkness; and
    program instructions for squirting the plurality of adjacent high-resolution pixels with ink droplets according to the low-resolution image data in common, where the plurality of nozzles assigned to said plurality of adjacent high-resolution pixels belongs to each of the sections, with each of the sections being assigned with a color ink having a different darkness.

* * * * *

UNITED STATES PATENT AND TRADEMARK OFFICE
CERTIFICATE OF CORRECTION

PATENT NO. : 7,222,928 B2  Page 1 of 1
APPLICATION NO. : 10/273492
DATED : May 29, 2007
INVENTOR(S) : Yukimitsu Fujimori It is certified that error appears in the above-identified patent and that said Letters Patent is hereby corrected as shown below:

Title page, item (75) should read as follows:
(75) Inventor: Yukimitsu Fujimori, Nagano (JP)

Signed and Sealed this

Tenth Day of November, 2009

David J. Kappos
*Director of the United States Patent and Trademark Office*